US 12,430,978 B2

United States Patent
MacKay et al.

(10) Patent No.: US 12,430,978 B2
(45) Date of Patent: Sep. 30, 2025

(54) PARKING METER WITH CONTACTLESS PAYMENT

(71) Applicant: J.J. MACKAY CANADA LIMITED, New Glasglow (CA)

(72) Inventors: George Allan MacKay, New Glasgow (CA); Gregory Emile Chauvin, Brookside (CA); Adrian Ignatius O'Neil, New Glasgow (CA)

(73) Assignee: J.J. MACKAY CANADA LIMITED, New Glasgow (CA)

( * ) Notice: Subject to any disclaimer, the term of this patent is extended or adjusted under 35 U.S.C. 154(b) by 0 days.

(21) Appl. No.: 18/142,428

(22) Filed: May 2, 2023

(65) Prior Publication Data
US 2023/0267795 A1 Aug. 24, 2023

Related U.S. Application Data

(63) Continuation of application No. 17/079,385, filed on Oct. 23, 2020, now Pat. No. 11,699,321, which is a
(Continued)

(30) Foreign Application Priority Data

Mar. 3, 2011 (CA) ........................................ 2733110
Oct. 28, 2011 (CA) ........................................ 2756489

(51) Int. Cl.
*G07F 17/24* (2006.01)
*G06K 7/00* (2006.01)
(Continued)

(52) U.S. Cl.
CPC ......... *G07F 17/248* (2013.01); *G06K 7/0004* (2013.01); *G06K 7/10316* (2013.01);
(Continued)

(58) Field of Classification Search
CPC ................ G07F 17/248; G06K 7/0004; G06K 19/0704; G06K 7/10316; G06Q 20/18;
(Continued)

(56) References Cited

U.S. PATENT DOCUMENTS 480,108 A 8/1892 Loch ............................... 232/62
1,046,833 A 12/1912 Miller
(Continued)

FOREIGN PATENT DOCUMENTS

| AT | 507762 | 7/2010 | ............ G07F 19/00 |
| AU | 4035701 | 9/2001 | ............ G07F 17/24 |

(Continued)

OTHER PUBLICATIONS

US 8,636,133 B2, 01/2014, MacKay et al. (withdrawn)
(Continued)

*Primary Examiner* — Michael G Lee
*Assistant Examiner* — David Tardif
(74) *Attorney, Agent, or Firm* — HAYES SOLOWAY P.C.

(57) ABSTRACT

A parking meter is described that comprises components for providing parking meter functionality and a display for displaying parking information and a metal housing for protecting the parking meter components from an environment that has a display aperture through which the display is visible. The parking meter also comprises an antenna for a contactless payment reader arranged in or on the parking meter in close proximity to the display.

16 Claims, 9 Drawing Sheets

Related U.S. Application Data continuation of application No. 16/548,513, filed on Aug. 22, 2019, now Pat. No. 10,861,278, which is a continuation of application No. 15/783,716, filed on Oct. 13, 2017, now Pat. No. 10,424,147, which is a continuation of application No. 14/864,170, filed on Sep. 24, 2015, now Pat. No. 9,934,645, which is a continuation of application No. 13/546,918, filed on Jul. 11, 2012, now Pat. No. 9,406,056, which is a continuation of application No. PCT/CA2012/000191, filed on Mar. 2, 2012, which is a continuation of application No. 13/410,831, filed on Mar. 2, 2012, now Pat. No. 8,770,371.

(51) Int. Cl.
| | | |
|---|---|---|
| *G06K 7/10* | (2006.01) | |
| *G06K 19/07* | (2006.01) | |
| *G06Q 20/18* | (2012.01) | |
| *G06Q 20/32* | (2012.01) | |
| *G06Q 20/34* | (2012.01) | |
| *G07B 15/00* | (2011.01) | |

(52) U.S. Cl.
CPC ......... *G06K 19/0704* (2013.01); *G06Q 20/18* (2013.01); *G06Q 20/3278* (2013.01); *G06Q 20/352* (2013.01); *G07B 15/00* (2013.01); *Y04S 50/12* (2013.01); *Y10T 29/49826* (2015.01)

(58) Field of Classification Search
CPC ... G06Q 20/3278; G06Q 20/352; G07B 15/00
USPC ......................................................... 235/380
See application file for complete search history.

(56) References Cited

U.S. PATENT DOCUMENTS

| | | | |
|---|---|---|---|
| 1,189,991 A | 7/1916 | Mugler | 70/120 |
| 1,445,771 A | 2/1923 | Keplinger | |
| 1,818,568 A | 8/1931 | Melick | 194/203 |
| D98,810 S | 3/1936 | Magee | |
| D100,875 S | 8/1936 | Michaels | |
| D101,237 S | 9/1936 | Miller | |
| D106,561 S | 10/1937 | Broussard et al. | |
| D107,577 S | 12/1937 | McGay | D10/42 |
| 2,118,318 A | 5/1938 | Magee | 194/84 |
| D112,677 S | 12/1938 | Broussard et al. | |
| 2,161,046 A | 6/1939 | Hitzeman | 194/205 |
| D116,805 S | 9/1939 | Reznek | |
| 2,229,183 A | 1/1941 | Mitchell | 194/277 |
| 2,261,353 A | 11/1941 | Gaetano | 70/120 |
| 2,289,838 A | 7/1942 | Herschede et al. | 194/226 |
| D152,294 S | 1/1949 | Siegel et al. | D20/10 |
| D152,587 S | 2/1949 | Brundage | D52/3 |
| D154,716 S | 8/1949 | Simpson | D10/42 |
| 2,483,805 A | 10/1949 | Broussard et al. | 232/1 |
| 2,495,784 A | 1/1950 | Starts | |
| 2,535,472 A | 12/1950 | Wood | 161/15 |
| D161,888 S | 2/1951 | Wilkin | D52/3 |
| D162,698 S | 3/1951 | Teague | D52/3 |
| 2,546,433 A | 3/1951 | Dick | 368/6 |
| 2,547,272 A | 4/1951 | Lawson et al. | 116/282 |
| 2,550,433 A | 4/1951 | Tichenor | 224/1 |
| 2,570,920 A | 10/1951 | Clough et al. | 232/16 |
| 2,575,650 A | 11/1951 | Alexander | 161/15 |
| D166,059 S | 2/1952 | Yoss | D10/42 |
| 2,594,388 A | 4/1952 | Broussard | 194/1 |
| 2,595,124 A | 4/1952 | Campbell | 250/27 |
| D166,753 S | 5/1952 | Jones | D10/42 |
| 2,596,122 A | 5/1952 | Broussard | 194/101 |
| 2,596,123 A | 5/1952 | Broussard | 194/1 |
| 2,596,124 A | 5/1952 | Broussard | 368/90 |
| 2,599,881 A | 6/1952 | Woodruff | 368/92 |
| 2,613,792 A | 10/1952 | Broussard | 194/72 |
| 2,613,871 A | 10/1952 | Broussard et al. | 232/16 |
| 2,618,371 A | 11/1952 | Broussard | 194/84 |
| 2,633,960 A | 4/1953 | Broussard | 194/72 |
| 2,652,551 A | 9/1953 | Gumpertz et al. | 340/51 |
| D181,359 S | 11/1957 | Jones | D10/42 |
| 2,818,371 A | 12/1957 | Wessinger | 167/93 |
| 2,822,682 A | 2/1958 | Sollenberger | 70/158 |
| 2,832,506 A | 4/1958 | Hatcher | 221/103 |
| 2,945,341 A | 7/1960 | Griffin et al. | 58/142 |
| D189,106 S | 10/1960 | Leiderman | D52/3 |
| 2,956,525 A | 10/1960 | Blauvelt | 109/59 |
| 2,985,978 A | 5/1961 | Breen et al. | 40/333 |
| 2,988,191 A | 6/1961 | Grant | 194/1 |
| 2,995,230 A | 8/1961 | Moody et al. | 194/9 |
| 3,018,615 A | 1/1962 | Minton et al. | 368/7 |
| 3,056,544 A | 10/1962 | Sollenberger et al. | 232/16 |
| 3,114,128 A | 12/1963 | Ljungman et al. | 340/51 |
| 3,141,292 A | 7/1964 | Bailey et al. | 58/142 |
| D199,270 S | 9/1964 | Michaels | D52/3 |
| 3,154,175 A | 10/1964 | Botterill et al. | 188/73 |
| 3,166,732 A | 1/1965 | Ljungman et al. | 340/51 |
| D200,216 S | 2/1965 | Broussard | D52/3 |
| 3,183,411 A | 5/1965 | Palfi | 317/123 |
| 3,194,005 A | 7/1965 | Schalow | 53/142 |
| 3,199,321 A | 8/1965 | Sollenberger | 70/1.5 |
| 3,204,438 A | 9/1965 | Sollenberger | 70/417 |
| 3,208,061 A | 9/1965 | Gervasi et al. | 340/539.31 |
| 3,262,540 A | 7/1966 | Sollenberger et al. | 194/72 |
| 3,272,299 A | 9/1966 | Sollenberger | 194/2 |
| 3,324,647 A | 6/1967 | Jedynak | 368/6 |
| 3,373,856 A | 3/1968 | Kusters et al. | 194/100 |
| 3,438,031 A | 4/1969 | Fathauer | 343/8 |
| 3,486,324 A | 12/1969 | Andersson | 368/90 |
| 3,519,113 A | 7/1970 | Arzig et al. | 194/2 |
| 3,535,870 A | 10/1970 | Mitchell | 58/142 |
| 3,565,283 A | 2/1971 | Sciacero et al. | 221/197 |
| 3,637,277 A | 1/1972 | Krug et al. | 312/217 |
| 3,666,067 A | 5/1972 | Kaiser | 194/225 |
| 3,721,463 A | 3/1973 | Attwood et al. | 287/20.3 |
| 3,770,090 A | 11/1973 | Fayling et al. | 194/1 B |
| D230,511 S | 2/1974 | Stieber | D6/4 |
| 3,858,165 A | 12/1974 | Pegg | 340/3 R |
| D234,606 S | 3/1975 | Gamble | D23/150 |
| 3,873,964 A | 3/1975 | Potter | 340/38 |
| 3,875,555 A | 4/1975 | Potter | 340/38 |
| D235,801 S | 7/1975 | Gore | D52/3 R |
| 3,930,363 A | 1/1976 | Rubenstein | 58/142 |
| 3,941,989 A | 3/1976 | McLaughlin et al. | 235/156 |
| 3,943,339 A | 3/1976 | Koerner et al. | 235/92 |
| 3,964,590 A | 6/1976 | May et al. | 194/83 |
| 3,975,934 A | 8/1976 | Babai et al. | 70/120 |
| 3,982,620 A | 9/1976 | Kortenhaus | 194/1 N |
| 3,991,595 A | 11/1976 | Bahry et al. | 70/120 |
| 3,999,372 A | 12/1976 | Welch et al. | 58/142 |
| 4,007,564 A | 2/1977 | Chisholm | 52/98 |
| 4,025,791 A | 5/1977 | Lennington et al. | 250/341 |
| 4,031,991 A | 6/1977 | Malott | 194/1 R |
| 4,037,700 A | 7/1977 | Heraty | 194/1 |
| 4,043,117 A | 8/1977 | Maresca et al. | 58/142 |
| D246,917 S | 1/1978 | Sauter | D21/3 |
| 4,147,707 A | 4/1979 | Alewelt et al. | 260/37 SB |
| 4,183,205 A | 1/1980 | Kaiser | 58/142 |
| 4,237,710 A | 12/1980 | Cardozo | 70/108 |
| 4,248,336 A | 2/1981 | Fiedler | 194/97 |
| 4,249,648 A | 2/1981 | Meyer | 194/102 |
| 4,264,963 A | 4/1981 | Leach | 364/707 |
| 4,306,219 A | 12/1981 | Main et al. | 340/825.54 |
| 4,310,890 A | 1/1982 | Trehn et al. | 364/467 |
| 4,317,180 A | 2/1982 | Lies | 364/707 |
| 4,317,181 A | 2/1982 | Teza et al. | 364/707 |
| 4,323,847 A | 4/1982 | Karbowski | 324/327 |
| 4,358,749 A | 11/1982 | Clark | G08B 13/26 |
| 4,369,442 A | 1/1983 | Werth et al. | 340/825.35 |
| 4,379,334 A | 4/1983 | Feagins, Jr. et al. | 364/467 |
| 4,391,883 A | 7/1983 | Williamson et al. | |
| 4,409,665 A | 10/1983 | Tubbs | 364/707 |
| D272,291 S | 1/1984 | Hauser et al. | D99/28 |
| 4,432,447 A | 2/1984 | Tanaka | 194/100 |

(56) References Cited

U.S. PATENT DOCUMENTS

| | | | |
|---|---|---|---|
| 4,438,426 A | 3/1984 | Adkins | 340/64 |
| 4,460,080 A | 7/1984 | Howard | 194/100 A |
| 4,460,965 A | 7/1984 | Trehn et al. | 364/464 |
| 4,472,706 A | 9/1984 | Hodge et al. | G08C 1/01 |
| 4,474,281 A | 10/1984 | Roberts et al. | 194/1 N |
| 4,479,191 A | 10/1984 | Nojima et al. | 364/707 |
| 4,483,431 A | 11/1984 | Pratt | 194/97 |
| 4,491,841 A | 1/1985 | Clark | G08C 1/00 |
| D278,689 S | 5/1985 | Jupe | D10/42 |
| 4,574,936 A | 3/1986 | Klinger | 194/318 |
| 4,615,280 A | 10/1986 | Shoop et al. | 109/24.1 |
| 4,639,021 A | 1/1987 | Hope | 292/7 |
| D288,441 S | 2/1987 | Lalonde | D14/55 |
| D289,914 S | 5/1987 | Willinger et al. | D23/4 |
| 4,678,994 A | 7/1987 | Davies | 324/236 |
| 4,680,717 A | 7/1987 | Martin | G08G 1/07 |
| 4,697,171 A | 9/1987 | Suh | 340/543 |
| 4,738,334 A | 4/1988 | Weishaupt | 180/287 |
| 4,742,903 A | 5/1988 | Trummer | 194/317 |
| 4,749,074 A | 6/1988 | Ueki et al. | 194/317 |
| 4,754,126 A | 6/1988 | Caldwell | G06K 5/00 |
| D296,795 S | 7/1988 | Bouve | D20/10 |
| 4,763,769 A | 8/1988 | Levasseur | 194/217 |
| 4,789,859 A | 12/1988 | Clarkson et al. | 340/825.31 |
| 4,798,273 A | 1/1989 | Ward, II | 194/350 |
| 4,809,838 A | 3/1989 | Houserman | 194/317 |
| 4,812,805 A | 3/1989 | Lachat et al. | 340/825.05 |
| 4,823,928 A | 4/1989 | Speas | |
| 4,825,425 A | 4/1989 | Turner | 368/7 |
| 4,827,206 A | 5/1989 | Speas | 323/299 |
| 4,845,484 A | 7/1989 | Ellsberg | 340/825.35 |
| 4,848,556 A | 7/1989 | Shah et al. | 194/212 |
| 4,851,987 A | 7/1989 | Day | 364/200 |
| 4,872,149 A | 10/1989 | Speas | 368/90 |
| 4,875,598 A | 10/1989 | Dahl | 221/4 |
| 4,880,097 A | 11/1989 | Speas | 194/239 |
| 4,880,406 A | 11/1989 | Van Horn et al. | 464/38 |
| 4,895,238 A | 1/1990 | Speas | 194/319 |
| D307,875 S | 5/1990 | Mallory | D10/106 |
| 4,951,799 A | 8/1990 | Xai | 194/317 |
| 4,967,895 A | 11/1990 | Speas | 194/200 |
| 4,976,630 A | 12/1990 | Schuder et al. | 439/260 |
| 4,989,714 A | 2/1991 | Abe | 194/317 |
| 5,027,390 A | 6/1991 | Hughes | 379/150 |
| 5,027,935 A | 7/1991 | Berg et al. | 194/318 |
| 5,029,094 A | 7/1991 | Wong | 364/467 |
| D319,077 S | 8/1991 | Arato et al. | D20/6 |
| 5,036,859 A | 8/1991 | Brown | A61B 5/20 |
| 5,060,777 A | 10/1991 | Van Horn et al. | 194/317 |
| 5,065,156 A | 11/1991 | Bernier | 340/932.2 |
| 5,076,414 A | 12/1991 | Kimoto | 194/317 |
| 5,088,073 A | 2/1992 | Speas | 368/90 |
| 5,109,972 A | 5/1992 | Van Horn et al. | 194/217 |
| 5,119,916 A | 6/1992 | Carmen et al. | 194/210 |
| 5,142,277 A | 8/1992 | Yarberry et al. | G04Q 1/00 |
| 5,153,525 A | 10/1992 | Hoekman et al. | G01R 27/26 |
| 5,155,614 A | 10/1992 | Carmen et al. | 398/202 |
| 5,158,166 A | 10/1992 | Barson | 194/319 |
| D331,996 S | 12/1992 | Fukutake et al. | D99/28 |
| 5,184,707 A | 2/1993 | Van Horn et al. | 194/204 |
| 5,192,855 A | 3/1993 | Insulander et al. | 235/381 |
| 5,201,396 A | 4/1993 | Chalabian et al. | 194/217 |
| D335,460 S | 5/1993 | Tanaka | D10/40 |
| D336,860 S | 6/1993 | Clough | D10/42 |
| 5,222,076 A | 6/1993 | Ng et al. | 375/9 |
| D337,953 S | 8/1993 | Verborn et al. | D10/40 |
| 5,244,070 A | 9/1993 | Carmen et al. | 194/319 |
| D340,038 S | 10/1993 | Venne et al. | D14/420 |
| 5,259,491 A | 11/1993 | Ward, II | 194/350 |
| 5,266,947 A | 11/1993 | Fujiwara et al. | 340/932.2 |
| D342,209 S | 12/1993 | Clough | D10/42 |
| 5,273,151 A | 12/1993 | Carmen et al. | 194/319 |
| 5,287,384 A | 2/1994 | Avery et al. | 375/1 |
| 5,293,979 A | 3/1994 | Levasseur | 194/317 |
| 5,298,894 A | 3/1994 | Cerny et al. | 340/870.02 |
| 5,339,594 A | 8/1994 | Ventura-Berti | 52/727 |
| 5,343,237 A | 8/1994 | Morimoto | 348/143 |
| 5,351,187 A | 9/1994 | Hassett | G06F 15/21 |
| D351,193 S | 10/1994 | Abe | D20/9 |
| 5,351,798 A | 10/1994 | Hayes | 194/318 |
| 5,360,095 A | 11/1994 | Speas | 194/217 |
| D354,047 S | 1/1995 | Leggate et al. | D14/101 |
| D354,835 S | 1/1995 | Brendel | D99/43 |
| 5,382,780 A | 1/1995 | Carmen | 235/384 |
| 5,402,475 A | 3/1995 | Lesner, Jr. et al. | 379/106 |
| 5,407,049 A | 4/1995 | Jacobs | 194/200 |
| 5,426,363 A | 6/1995 | Akagi et al. | 324/239 |
| D360,734 S | 7/1995 | Hall | D99/28 |
| D360,737 S | 7/1995 | Helbig, Jr. | D99/28 |
| 5,439,089 A | 8/1995 | Parker | 194/317 |
| 5,442,348 A | 8/1995 | Mushell | 340/932.2 |
| 5,454,461 A | 10/1995 | Jacobs | 194/200 |
| D364,165 S | 11/1995 | Esslinger | D14/213 |
| 5,471,139 A | 11/1995 | Zadoff | 324/244.1 |
| 5,475,373 A | 12/1995 | Speas | 340/815.58 |
| 5,489,014 A | 2/1996 | Menoud | 194/211 |
| 5,500,517 A | 3/1996 | Cagliostro | 235/486 |
| 5,507,378 A | 4/1996 | Leone | 194/202 |
| 5,526,662 A | 6/1996 | Diekhoff et al. | 70/278 |
| 5,563,491 A | 10/1996 | Tseng | 320/2 |
| 5,568,441 A | 10/1996 | Sanemitsu | 365/229 |
| D375,607 S | 11/1996 | Hall | D99/28 |
| 5,570,771 A | 11/1996 | Jacobs | 194/200 |
| 5,573,099 A | 11/1996 | Church et al. | 194/317 |
| 5,614,892 A | 3/1997 | Ward, II et al. | 340/870.02 |
| 5,617,942 A | 4/1997 | Ward, II et al. | 194/217 |
| 5,619,932 A | 4/1997 | Efland et al. | 109/24.1 |
| 5,640,002 A | 6/1997 | Ruppert et al. | 235/472 |
| 5,642,119 A * | 6/1997 | Jacobs | G07D 3/14 |
| | | | 342/69 |
| 5,648,906 A | 7/1997 | Amirpanahi | 705/418 |
| D381,976 S | 8/1997 | Sandor et al. | D14/420 |
| 5,659,306 A | 8/1997 | Bahar | 340/932.2 |
| 5,687,129 A | 11/1997 | Kim | 365/229 |
| D388,227 S | 12/1997 | Dallman et al. | D99/28 |
| D388,231 S | 12/1997 | Magee et al. | D99/28 |
| 5,710,743 A | 1/1998 | Dee et al. | 368/90 |
| D391,238 S | 2/1998 | Sakata | D14/420 |
| 5,732,812 A | 3/1998 | Grainger et al. | 194/217 |
| D393,212 S | 4/1998 | Lucas | D10/42 |
| 5,737,710 A | 4/1998 | Anthonyson | 701/1 |
| 5,740,050 A | 4/1998 | Ward, II | 364/464.28 |
| 5,748,103 A | 5/1998 | Flach et al. | 340/870.07 |
| D395,133 S | 6/1998 | Makami et al. | D99/43 |
| 5,761,061 A | 6/1998 | Amano | 364/187 |
| 5,777,302 A | 7/1998 | Nakagawa et al. | 235/7 A |
| 5,777,951 A | 7/1998 | Mitschele et al. | 368/90 |
| 5,777,957 A | 7/1998 | Lyman | 369/37 |
| 5,778,067 A | 7/1998 | Jones et al. | 380/24 |
| D396,655 S | 8/1998 | Anderson | D10/42 |
| 5,792,298 A | 8/1998 | Sauer et al. | C03C 27/12 |
| 5,803,228 A | 9/1998 | Lucas | 194/350 |
| 5,805,083 A | 9/1998 | Sutton et al. | 340/932.2 |
| 5,806,651 A | 9/1998 | Carmen et al. | 194/319 |
| D400,115 S | 10/1998 | Yaron et al. | D10/104 |
| D400,684 S | 11/1998 | Dallman | D99/28 |
| 5,833,042 A | 11/1998 | Baitch et al. | 194/317 |
| 5,841,369 A | 11/1998 | Sutton et al. | 340/932.2 |
| 5,842,411 A | 12/1998 | Johnson | 101/36 |
| 5,845,268 A | 12/1998 | Moore | 705/418 |
| 5,852,411 A | 12/1998 | Jacobs et al. | 340/932.2 |
| D404,025 S | 1/1999 | Van Horne et al. | D14/331 |
| 5,903,520 A | 5/1999 | Dee et al. | 368/90 |
| 5,906,260 A | 5/1999 | Goodrich | 194/203 |
| 5,911,763 A | 6/1999 | Quesada | 70/120 |
| 5,915,246 A | 6/1999 | Patterson et al. | G06F 17/60 |
| D411,848 S | 7/1999 | Maruska et al. | D16/202 |
| D412,233 S | 7/1999 | Cajacob et al. | D99/28 |
| D412,289 S | 7/1999 | Winwood | D10/42 |
| D413,311 S | 8/1999 | Blalock | D14/420 |
| 5,936,527 A | 8/1999 | Isaacman et al. | 340/572.1 |
| 5,936,551 A | 8/1999 | Allen et al. | G08G 1/01 |
| 5,940,481 A | 8/1999 | Zietman | 379/114 |
| 5,946,774 A | 9/1999 | Ramsey et al. | E05D 11/06 |

(56) References Cited

U.S. PATENT DOCUMENTS

| | | | |
|---|---|---|---|
| 5,954,182 A | 9/1999 | Wei | 194/345 |
| 5,966,345 A | 10/1999 | Dee et al. | 368/90 |
| D419,277 S | 1/2000 | Ishii et al. | D99/35 |
| 6,018,327 A | 1/2000 | Nakano et al. | G01Q 1/36 |
| 6,026,946 A | 2/2000 | McCarty, Jr. | 194/317 |
| 6,029,888 A | 2/2000 | Harvey | G06F 17/60 |
| D421,399 S | 3/2000 | Bennett et al. | D10/50 |
| 6,037,880 A | 3/2000 | Manion | 340/932.2 |
| D423,181 S | 4/2000 | Dallman | D99/28 |
| D423,755 S | 4/2000 | Ha | D99/28 |
| 6,052,453 A | 4/2000 | Sagady et al. | 379/146 |
| D427,413 S | 6/2000 | Wallace et al. | D99/35 |
| 6,078,272 A | 6/2000 | Jacobs et al. | 340/932.2 |
| 6,081,205 A | 6/2000 | Williams | 340/932.2 |
| 6,081,206 A | 6/2000 | Kielland | 340/937 |
| 6,082,153 A | 7/2000 | Schoell et al. | 70/1.5 |
| D430,045 S | 8/2000 | Omuro et al. | D10/43 |
| 6,098,361 A | 8/2000 | Roten et al. | 52/298 |
| 6,107,942 A | 8/2000 | Yoo et al. | 340/932.2 |
| 6,109,418 A | 8/2000 | Yost | 194/350 |
| 6,111,522 A | 8/2000 | Hiltz et al. | 340/932.2 |
| D430,810 S | 9/2000 | Omuro et al. | D10/43 |
| 6,116,403 A | 9/2000 | Kiehl | 194/217 |
| 6,121,880 A | 9/2000 | Scott et al. | G08B 13/157 |
| D431,788 S | 10/2000 | Tuxen et al. | D10/42 |
| D432,286 S | 10/2000 | Irie | D99/34 |
| 6,132,152 A | 10/2000 | Kaibach et al. | 411/54.1 |
| 6,147,624 A | 11/2000 | Clapper | 340/932.2 |
| D437,468 S | 2/2001 | Fukutake et al. | D99/28 |
| 6,188,328 B1 | 2/2001 | Ho | 340/932.2 |
| 6,193,045 B1 | 2/2001 | Ishida et al. | 194/217 |
| 6,195,015 B1 | 2/2001 | Jacobs et al. | 340/693.9 |
| D439,591 S | 3/2001 | Reidt et al. | D16/208 |
| RE37,193 E | 5/2001 | Ward et al. | 194/217 |
| 6,227,343 B1 | 5/2001 | Neathway et al. | 194/319 |
| 6,229,455 B1 | 5/2001 | Yost et al. | 340/943 |
| 6,230,868 B1 | 5/2001 | Tuxen et al. | 194/217 |
| 6,236,716 B1 | 5/2001 | Marcus et al. | H04M 11/00 |
| 6,243,028 B1 | 6/2001 | Krygler et al. | 340/932.2 |
| 6,243,029 B1 | 6/2001 | Tomer | 340/932.2 |
| 6,275,169 B1 | 8/2001 | Krygler et al. | 340/932.2 |
| 6,275,170 B1 | 8/2001 | Jacobs et al. | 340/932.2 |
| D447,519 S | 9/2001 | Pinchuk et al. | D21/324 |
| D447,714 S | 9/2001 | Cappiello | D10/104 |
| D448,910 S | 10/2001 | Kit et al. | D99/28 |
| D449,010 S | 10/2001 | Petrucelli | D10/109 |
| 6,307,152 B1 | 10/2001 | Bonilla et al. | H02G 3/04 |
| 6,309,098 B1 | 10/2001 | Wong | 368/94 |
| D450,253 S | 11/2001 | Marguet | D10/42 |
| 6,312,152 B2 | 11/2001 | Dee et al. | 368/90 |
| 6,321,201 B1 | 11/2001 | Dahl | 705/1 |
| RE37,531 E | 1/2002 | Chaco et al. | 379/38 |
| 6,340,935 B1 | 1/2002 | Hall | 340/932.2 |
| 6,344,806 B1 | 2/2002 | Katz | 340/932.2 |
| D454,421 S | 3/2002 | Jeon et al. | D99/28 |
| D454,807 S | 3/2002 | Cappiello | D10/109 |
| 6,354,425 B1 | 3/2002 | Tuxen et al. | 194/350 |
| D456,587 S | 4/2002 | Kit et al. | D99/28 |
| 6,366,220 B1 | 4/2002 | Elliott | 340 |
| 6,373,401 B2 | 4/2002 | Ho | 340/932.2 |
| 6,373,422 B1 | 4/2002 | Mostafa | 341/155 |
| 6,373,442 B1 * | 4/2002 | Thomas | H01Q 1/2233 343/700 MS |
| 6,380,851 B1 | 4/2002 | Gilbert et al. | 340/517 |
| D460,005 S | 7/2002 | Jacquet | D10/42 |
| D461,728 S | 8/2002 | Tuxen et al. | D10/42 |
| 6,456,491 B1 | 9/2002 | Flannery et al. | 361/685 |
| D463,749 S | 10/2002 | Petrucelli | D10/109 |
| 6,457,586 B2 | 10/2002 | Yasuda et al. | 209/534 |
| 6,467,602 B2 | 10/2002 | Bench et al. | 194/217 |
| 6,477,505 B2 | 11/2002 | Ward, II et al. | G06F 17/60 |
| 6,477,875 B2 | 11/2002 | Field et al. | 70/491 |
| D467,954 S | 12/2002 | Suzuki et al. | D16/208 |
| 6,493,676 B1 | 12/2002 | Levy | 705/13 |
| 6,505,774 B1 | 1/2003 | Fulcher et al. | |
| D471,238 S | 3/2003 | Showers et al. | D20/8 |
| D472,362 S | 3/2003 | Zerman et al. | D99/28 |
| 6,527,172 B1 | 3/2003 | Lewis et al. | G06F 17/60 |
| 6,539,370 B1 | 3/2003 | Chang et al. | 707/2 |
| 6,559,776 B2 | 5/2003 | Katz | 340/932.2 |
| 6,575,281 B2 | 6/2003 | Lee | 192/49 |
| D477,030 S | 7/2003 | Kolls et al. | D20/8 |
| D481,516 S | 10/2003 | Magee et al. | D99/28 |
| D485,417 S | 1/2004 | Magee et al. | D99/28 |
| 6,697,730 B2 | 2/2004 | Dickerson | 701/200 |
| D488,280 S | 4/2004 | Zerman et al. | D99/28 |
| 6,731,942 B1 | 5/2004 | Nageli | 455/458 |
| D490,727 S | 6/2004 | Kido et al. | D10/60 |
| D492,080 S | 6/2004 | Magee et al. | D99/28 |
| D492,081 S | 6/2004 | Magee et al. | D99/28 |
| D492,085 S | 6/2004 | Korte et al. | D99/43 |
| 6,747,575 B2 | 6/2004 | Chauvin et al. | 340/932.2 |
| 6,763,094 B2 | 7/2004 | Conn et al. | 379/91.01 |
| D494,730 S | 8/2004 | Magee et al. | D99/28 |
| 6,791,473 B2 | 9/2004 | Kibria et al. | 340/932.2 |
| RE38,626 E | 10/2004 | Kielland | 340/937 |
| D497,393 S | 10/2004 | Herbst | D20/99 |
| 6,799,387 B2 | 10/2004 | Pippins | 37/456 |
| D497,814 S | 11/2004 | Odinotski et al. | D10/42 |
| D498,795 S | 11/2004 | Nunn | D20/8 |
| 6,812,857 B1 | 11/2004 | Kassab et al. | 340/932.2 |
| 6,823,317 B1 | 11/2004 | Ouimet et al. | 705/13 |
| 6,856,922 B1 | 2/2005 | Austin et al. | 702/63 |
| 6,874,340 B1 | 4/2005 | Berman | 7/161 |
| 6,885,311 B2 | 4/2005 | Howard et al. | 340/932.2 |
| D505,240 S | 5/2005 | Swaine et al. | D99/28 |
| D505,765 S | 5/2005 | Swaine et al. | D99/28 |
| 6,889,899 B2 | 5/2005 | Silberberg | 235/384 |
| D506,509 S | 6/2005 | Nunn | D20/9 |
| D506,769 S | 6/2005 | Asai | D16/203 |
| 6,914,411 B2 | 7/2005 | Couch et al. | 320/101 |
| D508,064 S | 8/2005 | Ramirez | D16/200 |
| 6,929,179 B2 | 8/2005 | Fulcher et al. | 235/381 |
| 6,946,974 B1 | 9/2005 | Racunas Jr. | 340/932.2 |
| D510,751 S | 10/2005 | Magee et al. | D20/3 |
| 7,004,385 B1 | 2/2006 | Douglass | 235/379 |
| 7,014,355 B2 | 3/2006 | Potter, Sr. et al. | 368/90 |
| 7,019,420 B2 | 3/2006 | Kogan et al. | 307/150 |
| 7,019,670 B2 | 3/2006 | Bahar | 340/932.2 |
| 7,023,360 B2 | 4/2006 | Staniszewski | 340/932.2 |
| 7,027,773 B1 | 4/2006 | McMillin | 455/41.2 |
| 7,027,808 B2 | 4/2006 | Wesby | 455/419 |
| 7,028,888 B2 | 4/2006 | Laskowski | 235/379 |
| 7,029,167 B2 | 4/2006 | Mitschele | 368/90 |
| D520,883 S | 5/2006 | Hillard et al. | D10/50 |
| 7,040,534 B2 | 5/2006 | Turocy et al. | 235/379 |
| 7,046,123 B1 | 5/2006 | Goldberg | 340/309.8 |
| D524,834 S | 7/2006 | Dozier et al. | D16/200 |
| 7,071,839 B2 | 7/2006 | Patel et al. | 340/933 |
| 7,104,447 B1 | 9/2006 | Lopez et al. | 235/384 |
| 7,110,762 B1 | 9/2006 | Cameron et al. | 455/434 |
| D530,880 S | 10/2006 | Magee et al. | D99/28 |
| 7,114,651 B2 | 10/2006 | Hjelmvik | 235/384 |
| 7,131,576 B2 | 11/2006 | Utz et al. | 235/379 |
| D535,268 S | 1/2007 | Holger | D14/130 |
| 7,181,426 B2 | 2/2007 | Dutta | 705/37 |
| 7,183,999 B2 | 2/2007 | Matthews et al. | 345/1.1 |
| D538,505 S | 3/2007 | Kang et al. | D99/28 |
| 7,188,070 B2 | 3/2007 | Dar et al. | 750/1 |
| D543,588 S | 5/2007 | Herbert et al. | D20/8 |
| 7,222,031 B2 | 5/2007 | Heatley | |
| 7,222,782 B2 | 5/2007 | Lute, Jr. et al. | 235/379 |
| 7,230,545 B2 | 6/2007 | Nath et al. | 340/932.2 |
| 7,237,176 B2 | 6/2007 | Briggs et al. | 714/67 |
| D546,365 S | 7/2007 | Jost et al. | D16/221 |
| 7,237,716 B2 | 7/2007 | Silberberg | 235/384 |
| 7,253,747 B2 | 8/2007 | Noguchi | 340/932.2 |
| 7,262,737 B2 | 8/2007 | Zarnowitz et al. | 343/702 |
| 7,284,692 B1 | 10/2007 | Douglass | 235/379 |
| D559,792 S | 1/2008 | Gemme et al. | D13/164 |
| 7,319,974 B1 | 1/2008 | Brusseaux | 705/13 |
| 7,321,317 B2 | 1/2008 | Nath et al. | 340/933 |
| 7,330,131 B2 | 2/2008 | Zanotti et al. | 340/932.2 |
| D570,920 S | 6/2008 | Choi | D20/2 |

(56) References Cited

U.S. PATENT DOCUMENTS

| | | | |
|---|---|---|---|
| 7,382,238 B2 | 6/2008 | Kavaler | 340/438 |
| 7,382,281 B2 | 6/2008 | Kavaler | 340/941 |
| 7,382,282 B2 | 6/2008 | Kavaler | 340/941 |
| 7,385,484 B2 | 6/2008 | Nath et al. | 340/426.1 |
| 7,388,349 B2 | 6/2008 | Elder et al. | 320/104 |
| 7,388,517 B2 | 6/2008 | Kavaler | 340/941 |
| 7,391,339 B2 | 6/2008 | Howard et al. | 340/932.2 |
| 7,393,134 B2 | 7/2008 | Mitschele | 368/90 |
| D575,168 S | 8/2008 | King et al. | D10/42 |
| 7,419,091 B1 | 9/2008 | Scanlon | 235/379 |
| 7,427,931 B1 | 9/2008 | Kavaler et al. | 340/941 |
| D579,795 S | 11/2008 | Martinez et al. | D10/42 |
| 7,445,144 B2 | 11/2008 | Schlabach et al. | 235/379 |
| D582,125 S | 12/2008 | Kang et al. | D99/28 |
| D587,141 S | 2/2009 | King et al. | D10/42 |
| D588,916 S | 3/2009 | DeMarco | D9/504 |
| D591,181 S | 4/2009 | Kanbar | D10/40 |
| D592,825 S | 5/2009 | Kang et al. | D99/28 |
| 7,533,802 B1 | 5/2009 | McGinley et al. | 235/379 |
| 7,533,809 B1 | 5/2009 | Robinson et al. | G06K 5/00 |
| 7,554,460 B2 | 6/2009 | Verkleeren et al. | 340/870.02 |
| D596,373 S | 7/2009 | Kang et al. | D99/28 |
| D596,374 S | 7/2009 | Kang et al. | D99/28 |
| 7,558,564 B2 | 7/2009 | Wesby | 455/419 |
| 7,575,166 B2 | 8/2009 | McNamara | 235/440 |
| 7,579,964 B2 | 8/2009 | Nath et al. | 340/933 |
| D600,152 S | 9/2009 | Stack et al. | 10/5 |
| 7,594,235 B2 | 9/2009 | Moreau | 719/310 |
| D602,225 S | 10/2009 | Lute et al. | D99/28 |
| D604,189 S | 11/2009 | Leer et al. | D10/123 |
| 7,611,045 B1 | 11/2009 | Lute et al. | 235/379 |
| 7,617,120 B2 | 11/2009 | Derasmo et al. | 705/13 |
| D605,145 S | 12/2009 | Kellar | D14/125 |
| 7,624,919 B2 | 12/2009 | Meek et al. | 235/379 |
| 7,632,419 B1 | 12/2009 | Grimbergen et al. | 216/60 |
| 7,671,803 B2 | 3/2010 | Neill et al. | 343/700 MS |
| 7,679,526 B2 | 3/2010 | Mardirossian | 340/932.2 |
| 7,699,224 B2 | 4/2010 | Molé | 235/439 |
| D615,274 S | 5/2010 | Kim et al. | D99/28 |
| 7,717,327 B2 | 5/2010 | Gomes | 235/379 |
| D617,799 S | 6/2010 | Odhe et al. | D14/420 |
| 7,726,558 B1 | 6/2010 | Lute et al. | 235/379 |
| 7,739,000 B2 | 6/2010 | Kevaler | 701/1 |
| D620,050 S | 7/2010 | Hultzman et al. | D20/2 |
| 7,748,620 B2 | 7/2010 | Gomez et al. | 235/383 |
| 7,772,720 B2 | 8/2010 | McGee et al. | 307/66 |
| 7,780,072 B1 | 8/2010 | Lute et al. | 235/379 |
| 7,783,530 B2 | 8/2010 | Stemmer et al. | 750/28 |
| D624,274 S | 9/2010 | Pendleton | D99/28 |
| D625,305 S | 10/2010 | Bleck et al. | D14/307 |
| 7,806,248 B2 | 10/2010 | Hunter et al. | 194/317 |
| D627,814 S | 11/2010 | Tzeng et al. | D16/202 |
| 7,825,826 B2 | 11/2010 | Welch | 340/932.2 |
| D629,585 S | 12/2010 | Bleck et al. | D99/28 |
| 7,854,310 B2 | 12/2010 | King et al. | 194/350 |
| 7,855,661 B2 | 12/2010 | Ponert | 340/932.2 |
| 7,874,482 B2 | 1/2011 | Mitschele | 235/384 |
| D632,740 S | 2/2011 | Adeline | D20/2 |
| 7,891,546 B1 | 2/2011 | Steinbach et al. | 235/375 |
| D634,417 S | 3/2011 | Abbondanzio | D23/366 |
| D635,035 S | 3/2011 | Matsumoto | D10/41 |
| 7,899,583 B2 | 3/2011 | Mendelson | 701/1 |
| 7,908,149 B2 | 3/2011 | Dar et al. | 705/1 |
| 7,933,841 B2 | 4/2011 | Schmeyer et al. | 705/64 |
| 7,945,670 B2 | 5/2011 | Nakamura et al. | G06F 15/173 |
| D645,223 S | 9/2011 | Bleck et al. | D99/28 |
| 8,035,533 B2 | 10/2011 | Kavaler | 340/933 |
| 8,044,139 B2 | 10/2011 | Youn et al. | 524/606 |
| D651,784 S | 1/2012 | Rohan et al. | D99/28 |
| D652,329 S | 1/2012 | MacKay et al. | D10/42 |
| D652,601 S | 1/2012 | Rohan et al. | D99/28 |
| D652,602 S | 1/2012 | Rohan et al. | D99/28 |
| D652,872 S | 1/2012 | Mougin et al. | D20/1 |
| D653,012 S | 1/2012 | Rohan et al. | D99/28 |
| D653,014 S | 1/2012 | Rohan et al. | D99/28 |
| D653,420 S | 1/2012 | Rohan et al. | D99/28 |
| D653,421 S | 1/2012 | Rohan et al. | D99/28 |
| D653,422 S | 1/2012 | Rohan et al. | D99/28 |
| D653,423 S | 1/2012 | Rohan et al. | D99/28 |
| D653,424 S | 1/2012 | Rohan et al. | D99/28 |
| D654,816 S | 2/2012 | MacKay et al. | D10/42 |
| RE43,245 E | 3/2012 | Ouimet et al. | 705/13 |
| D655,263 S | 3/2012 | Tsai | D14/125 |
| D656,046 S | 3/2012 | MacKay et al. | D10/42 |
| 8,138,950 B1 | 3/2012 | Leung | 340/932.2 |
| 8,144,034 B2 | 3/2012 | Kavaler | 340/941 |
| D659,557 S | 5/2012 | Jones et al. | D10/42 |
| 8,181,857 B1 | 5/2012 | Lute et al. | 235/379 |
| 8,184,019 B2 | 5/2012 | Chauvin et al. | 340/932.2 |
| D661,603 S | 6/2012 | MacKay et al. | D10/42 |
| D661,608 S | 6/2012 | Kimmich | D10/98 |
| 8,193,540 B2 | 6/2012 | Huang et al. | 257/81 |
| 8,207,394 B2 | 6/2012 | Feldkamp et al. | 604/361 |
| 8,232,894 B2 | 7/2012 | Weiss et al. | 340/932.2 |
| 8,264,401 B1 | 9/2012 | Kavaler | 342/128 |
| 8,279,107 B2 | 10/2012 | Krstanovic et al. | 342/27 |
| D672,525 S | 12/2012 | Lee et al. | D99/28 |
| 8,325,057 B2 | 12/2012 | Salter | G08B 23/00 |
| D674,985 S | 1/2013 | Lee | D99/28 |
| D677,035 S | 2/2013 | Lee et al. | D99/28 |
| D677,714 S | 3/2013 | Helgesson et al. | D18/4.4 |
| 8,395,532 B2 | 3/2013 | Chauvin et al. | 340/932.2 |
| 8,402,281 B2 | 3/2013 | Dahl | 718/189 |
| 8,402,380 B2 | 3/2013 | Kikin-Gil et al. | G06F 3/048 |
| D680,156 S | 4/2013 | Hernandez et al. | D18/4.4 |
| 8,417,715 B1 | 4/2013 | Bruckhaus et al. | 707/758 |
| D681,717 S | 5/2013 | Helgesson et al. | D18/4.6 |
| D682,504 S | 5/2013 | Lee et al. | D99/28 |
| 8,450,627 B2 | 5/2013 | Mittleman et al. | 200/600 |
| D683,779 S | 6/2013 | Uemachi et al. | D16/202 |
| D683,794 S | 6/2013 | Randall | D20/8 |
| D683,795 S | 6/2013 | Randall | D20/8 |
| D684,745 S | 6/2013 | Reuter et al. | D99/28 |
| D684,870 S | 6/2013 | Jones et al. | D10/42 |
| 8,479,909 B2 | 7/2013 | King et al. | 194/302 |
| 8,487,754 B2 | 7/2013 | Mitschele | 340/539.1 |
| D687,809 S | 8/2013 | Bergmann et al. | D14/209.1 |
| 8,513,832 B2 | 8/2013 | Hunter et al. | 307/66 |
| D689,554 S | 9/2013 | Echanove Hernandez | D20/2 |
| D690,771 S | 10/2013 | Randall | D20/9 |
| D691,165 S | 10/2013 | Attoma | D14/486 |
| 8,566,159 B2 | 10/2013 | King et al. | 705/14.53 |
| 8,568,055 B2 | 10/2013 | Marques Lito Velez Grilo | F16C 11/00 |
| D692,784 S | 11/2013 | Anderssen et al. | D10/70 |
| D693,983 S | 11/2013 | Budde et al. | D99/28 |
| 8,573,484 B1 | 11/2013 | Irudayam et al. | 235/379 |
| 8,589,216 B2 | 11/2013 | Yu et al. | 705/13 |
| 8,590,687 B2 | 11/2013 | King et al. | 194/350 |
| 8,595,054 B2 | 11/2013 | King et al. | 705/13 |
| D696,484 S | 12/2013 | Lee et al. | D99/28 |
| D696,485 S | 12/2013 | Lee et al. | D99/28 |
| 8,621,245 B2 | 12/2013 | Shearer et al. | 713/300 |
| 8,631,921 B2 | 1/2014 | Jones et al. | 194/350 |
| 8,662,279 B2 | 3/2014 | Jones et al. | 194/350 |
| 8,666,801 B2 | 3/2014 | Cho | 705/13 |
| D702,913 S | 4/2014 | Budde et al. | D99/28 |
| D702,914 S | 4/2014 | Budde et al. | D99/28 |
| 8,684,158 B2 | 4/2014 | Jones et al. | 194/215 |
| 8,710,798 B2 | 4/2014 | Turner | 320/109 |
| D705,090 S | 5/2014 | MacKay et al. | D10/42 |
| 8,727,207 B1 | 5/2014 | Church et al. | 235/33 |
| D707,140 S | 6/2014 | King et al. | D10/42 |
| D707,141 S | 6/2014 | King et al. | D10/42 |
| D707,142 S | 6/2014 | King et al. | D10/42 |
| D707,574 S | 6/2014 | Ku et al. | D10/40 |
| 8,749,403 B2 | 6/2014 | King et al. | 340/932.2 |
| 8,770,371 B2 | 7/2014 | MacKay et al. | 194/350 |
| 8,770,372 B2 | 7/2014 | Dobbins et al. | 194/350 |
| 8,807,317 B2 | 8/2014 | MacKay et al. | 194/350 |
| D714,165 S | 9/2014 | Salama | D10/42 |
| D715,661 S | 10/2014 | McKaughan et al. | D10/53 |
| D716,156 S | 10/2014 | Jones et al. | D10/42 |
| D716,515 S | 10/2014 | Cha et al. | D99/28 |

(56) References Cited

U.S. PATENT DOCUMENTS

| | | | |
|---|---|---|---|
| 8,862,494 B2 | 10/2014 | King et al. | 705/13 |
| 8,866,624 B2 | 10/2014 | Ales et al. | 340/604 |
| D716,671 S | 11/2014 | Jones et al. | D10/42 |
| 8,884,785 B2 | 11/2014 | Groft et al. | G06Q 20/3278 |
| 8,936,505 B2 | 1/2015 | Bengtsson | G07D 1/00 |
| D722,740 S | 2/2015 | Budde et al. | D99/28 |
| 8,957,787 B1 | 2/2015 | Al-Hmalan et al. | G08G 1/0175 |
| D724,290 S | 3/2015 | Cha et al. | D99/28 |
| D724,811 S | 3/2015 | Reitinger | D99/28 |
| D724,812 S | 3/2015 | Cha et al. | D99/28 |
| D725,504 S | 3/2015 | McEneany et al. | D10/42 |
| D728,190 S | 4/2015 | Sheley | D99/28 |
| 9,002,723 B2 | 4/2015 | King et al. | 340/932.2 |
| D732,263 S | 6/2015 | Budde et al. | D99/28 |
| 9,047,712 B2 | 6/2015 | King et al. | 705/1.1 |
| 9,064,358 B2 | 6/2015 | Lidror | H04Q 5/22 |
| D733,585 S | 7/2015 | Jones et al. | D10/42 |
| D735,437 S | 7/2015 | Randall | D99/28 |
| D735,438 S | 7/2015 | Randall | D99/28 |
| D735,439 S | 7/2015 | Randall | D99/28 |
| D735,440 S | 7/2015 | Randall | D99/28 |
| D735,963 S | 8/2015 | Randall | D99/28 |
| D735,964 S | 8/2015 | Randall | D99/28 |
| D735,965 S | 8/2015 | Randall | D99/28 |
| D739,637 S | 9/2015 | Randall | D99/28 |
| D739,638 S | 9/2015 | Randall | D99/28 |
| D739,639 S | 9/2015 | Randall | D99/28 |
| 9,123,184 B2 | 9/2015 | Jones et al. | G07B 15/00 |
| 9,127,964 B2 | 9/2015 | Schwarz et al. | 340/943 |
| 9,147,345 B2 | 9/2015 | Agrait et al. | G08G 1/14 |
| D741,040 S | 10/2015 | Budde et al. | D99/28 |
| D742,090 S | 10/2015 | Randall | D99/28 |
| 9,159,080 B2 | 10/2015 | Fiorucci et al. | G06Q 30/0226 |
| 9,169,626 B2 | 10/2015 | Guler et al. | E03D 3/06 |
| D742,371 S | 11/2015 | Bopp et al. | D14/336 |
| D743,956 S | 11/2015 | Kraft et al. | D14/307 |
| 9,196,097 B2 | 11/2015 | Jones et al. | 340/870.02 |
| 9,196,161 B2 | 11/2015 | Lai et al. | B60Q 1/48 |
| D746,015 S | 12/2015 | King et al. | D99/28 |
| D746,704 S | 1/2016 | Jones et al. | D10/42 |
| D748,364 S | 1/2016 | King et al. | D99/28 |
| D748,888 S | 2/2016 | King et al. | D99/28 |
| D749,000 S | 2/2016 | King et al. | D10/42 |
| D749,290 S | 2/2016 | Pollmann | D99/28 |
| 9,262,915 B2 | 2/2016 | Clem et al. | G08G 1/0112 |
| 9,269,216 B2 | 2/2016 | Keilwert | G07F 17/3206 |
| D750,513 S | 3/2016 | King et al. | D10/70 |
| D750,978 S | 3/2016 | van Slooten et al. | D10/41 |
| D752,552 S | 3/2016 | D'Ascanio et al. | D14/216 |
| D755,649 S | 5/2016 | King et al. | D10/42 |
| D755,650 S | 5/2016 | King et al. | D10/42 |
| D756,807 S | 5/2016 | King et al. | D10/42 |
| D756,808 S | 5/2016 | King et al. | D10/42 |
| D762,040 S | 7/2016 | King et al. | D99/28 |
| 9,384,554 B2 | 7/2016 | Xu et al. | G06T 7/0075 |
| 9,391,474 B2 | 7/2016 | Hunter et al. | H02J 9/06 |
| 9,406,056 B2 | 8/2016 | MacKay et al. | G06Q 30/02 |
| 9,407,608 B2 | 8/2016 | Mullick et al. | G06F 17/00 |
| 9,424,691 B2 | 8/2016 | King et al. | G07B 15/02 |
| 9,437,050 B2 | 9/2016 | Hilton et al. | G07B 15/00 |
| 9,443,236 B2 | 9/2016 | MacKay et al. | G06Q 30/02 |
| D769,570 S | 10/2016 | Kraft et al. | D99/28 |
| D769,571 S | 10/2016 | Lee et al. | D99/28 |
| D769,572 S | 10/2016 | Park et al. | D99/28 |
| 9,489,776 B2 | 11/2016 | Keller et al. | G07B 15/02 |
| 9,494,922 B2 | 11/2016 | MacKay et al. | G04C 11/026 |
| 9,508,198 B1 | 11/2016 | King et al. | G07B 15/02 |
| 9,508,260 B2 | 11/2016 | Shaik | G08G 1/14 |
| 9,519,761 B2 | 12/2016 | Jakobsson | G06F 7/04 |
| 9,524,498 B2 | 12/2016 | Jones et al. | G06Q 20/145 |
| 9,536,235 B2 | 1/2017 | Jones et al. | G06Q 20/145 |
| 9,536,370 B2 | 1/2017 | Jones et al. | G07F 17/246 |
| D779,771 S | 2/2017 | King et al. | D99/28 |
| D779,772 S | 2/2017 | King et al. | D99/28 |
| D779,773 S | 2/2017 | King et al. | D99/28 |
| D779,774 S | 2/2017 | King | D99/28 |
| 9,580,198 B2 | 2/2017 | Ehrmann et al. | B23B 41/00 |
| D781,024 S | 3/2017 | King et al. | D99/28 |
| D782,349 S | 3/2017 | Konotopskyi et al. | D10/70 |
| 9,661,403 B2 | 5/2017 | King et al. | H04Q 9/00 |
| 9,685,027 B2 | 6/2017 | King et al. | G07F 17/248 |
| 9,692,256 B2 | 6/2017 | Hunter et al. | H02J 9/061 |
| D791,621 S | 7/2017 | Loye et al. | D10/42 |
| D792,049 S | 7/2017 | Oh et al. | D99/28 |
| 9,697,506 B2 | 7/2017 | Jones et al. | G06Q 20/145 |
| 9,707,911 B1 | 7/2017 | Myers et al. | B60R 16/037 |
| D795,523 S | 8/2017 | King et al. | D99/28 |
| 9,728,085 B2 | 8/2017 | Schwarz et al. | G08G 1/017 |
| 9,746,954 B2 | 8/2017 | Wyatt et al. | G06F 3/0416 |
| 9,749,823 B2 | 8/2017 | Rowe et al. | H04W 4/18 |
| D796,355 S | 9/2017 | Cho et al. | D10/70 |
| 9,773,351 B2 | 9/2017 | Hudson et al. | G07B 15/02 |
| D799,992 S | 10/2017 | Ehara | D10/41 |
| D801,304 S | 10/2017 | Kiafoulis et al. | D14/214 |
| D801,405 S | 10/2017 | Shih et al. | D16/203 |
| 9,779,565 B2 | 10/2017 | Rabbat | G07C 9/00 |
| 9,805,518 B2 | 10/2017 | King et al. | G07B 15/02 |
| D802,874 S | 11/2017 | King et al. | D99/28 |
| D802,875 S | 11/2017 | King et al. | D99/28 |
| D802,876 S | 11/2017 | King et al. | D99/28 |
| D802,877 S | 11/2017 | King et al. | D99/28 |
| D802,878 S | 11/2017 | King et al. | D99/28 |
| 9,842,346 B2 | 12/2017 | Fiorucci et al. | G06Q 30/0226 |
| 9,842,455 B2 | 12/2017 | MacKay et al. | G07F 7/10 |
| D813,059 S | 3/2018 | MacKay et al. | D10/42 |
| D813,838 S | 3/2018 | Pietschmann et al. | D14/214 |
| 9,934,645 B2 | 4/2018 | MacKay et al. | G07F 17/24 |
| 10,069,233 B2 | 9/2018 | Goto | H01R 13/4223 |
| D832,553 S | 10/2018 | Angelopoulos et al. | D99/28 |
| 10,089,814 B2 | 10/2018 | King et al. | G07F 17/0021 |
| D832,809 S | 11/2018 | Hardi | D14/204 |
| 10,141,629 B2 | 11/2018 | Mackay | G04C 11/026 |
| D834,971 S | 12/2018 | Ahn et al. | D10/70 |
| 10,154,029 B1 | 12/2018 | Griffin | H04L 63/0861 |
| 10,192,388 B2 | 1/2019 | Mackay et al. | G07F 17/24 |
| D843,973 S | 3/2019 | Klosowski et al. | D14/216 |
| 10,262,345 B2 | 4/2019 | King et al. | G06Q 30/0284 |
| 10,275,650 B2 | 4/2019 | Laaksonen | G06K 9/00 |
| 10,297,150 B2 | 5/2019 | Schwarz et al. | G08B 23/00 |
| 10,299,018 B1 | 5/2019 | King et al. | H04Q 9/00 |
| D851,605 S | 6/2019 | Maetani et al. | D13/168 |
| D852,454 S | 6/2019 | King et al. | D99/43 |
| 10,315,665 B2 | 6/2019 | Halder | G01C 22/00 |
| D853,079 S | 7/2019 | King et al. | D99/43 |
| D853,678 S | 7/2019 | King et al. | D99/43 |
| D853,679 S | 7/2019 | King et al. | D99/43 |
| D854,430 S | 7/2019 | Elrod et al. | D10/52 |
| 10,366,546 B2 | 7/2019 | King et al. | G06Q 10/00 |
| D858,381 S | 9/2019 | Ahn et al. | D12/173 |
| 10,423,980 B2 | 9/2019 | King et al. | G06Q 30/0255 |
| 10,424,147 B2 | 9/2019 | MacKay et al. | G06K 7/00 |
| D863,074 S | 10/2019 | MacKay et al. | D10/42 |
| D863,075 S | 10/2019 | MacKay et al. | D10/42 |
| D863,076 S | 10/2019 | MacKay et al. | D10/42 |
| D863,987 S | 10/2019 | MacKay et al. | D10/42 |
| D863,988 S | 10/2019 | MacKay et al. | D10/42 |
| D865,315 S | 10/2019 | King et al. | D99/43 |
| 10,464,530 B2 | 11/2019 | Falkson et al. | B60R 25/25 |
| 10,491,972 B2 | 11/2019 | King et al. | H04Q 9/00 |
| 10,503,990 B2 | 12/2019 | Gleeson-May et al. | H04N 7/18 |
| D872,600 S | 1/2020 | King et al. | D10/43 |
| 10,573,953 B2 | 2/2020 | MacKay | H01Q 1/42 |
| 10,574,085 B2 | 2/2020 | Hunter et al. | H02J 9/061 |
| D879,404 S | 3/2020 | Morishita et al. | D99/28 |
| D882,426 S | 4/2020 | Gross et al. | D10/65 |
| D883,605 S | 5/2020 | Lee et al. | D99/28 |
| 10,664,880 B2 | 5/2020 | King et al. | G06Q 30/02 |
| D886,649 S | 6/2020 | Lan et al. | D10/70 |
| 10,674,236 B2 | 6/2020 | King et al. | H04Q 9/00 |
| 10,691,904 B1 | 6/2020 | Randall et al. | G06K 7/10 |
| 10,741,064 B2 | 8/2020 | Schwarz et al. | G08G 1/017 |
| D901,825 S | 11/2020 | Nelson et al. | D99/28 |
| 10,861,278 B2 | 12/2020 | MacKay et al. | G07F 17/24 |

(56) References Cited

U.S. PATENT DOCUMENTS

| | | | |
|---|---|---|---|
| 10,861,334 B2 | 12/2020 | Torres | G08G 1/14 |
| D911,857 S | 3/2021 | King et al. | D10/42 |
| RE48,566 E | 5/2021 | MacKay et al. | D10/42 |
| 10,998,612 B2 | 5/2021 | MacKay et al. | H01Q 1/22 |
| 11,074,612 B2 | 7/2021 | King et al. | G06Q 30/02 |
| D927,998 S | 8/2021 | Ahn et al. | D10/70 |
| D928,639 S | 8/2021 | Ahn et al. | D10/70 |
| 11,100,824 B2 | 8/2021 | King et al. | G09F 23/00 |
| D930,493 S | 9/2021 | Katzenelson | D10/106.6 |
| 11,132,723 B2 | 9/2021 | King et al. | G06Q 30/02 |
| 11,172,274 B2 | 11/2021 | King et al. | H04Q 9/00 |
| D938,668 S | 12/2021 | Jia | D30/199 |
| D954,571 S | 6/2022 | Ahn et al. | D10/70 |
| D955,230 S | 6/2022 | King et al. | D10/42 |
| D955,231 S | 6/2022 | King et al. | D10/42 |
| 11,386,420 B2 | 7/2022 | Nolan et al. | G06Q 20/3674 |
| D959,298 S | 8/2022 | Jones et al. | D10/42 |
| D959,299 S | 8/2022 | Jones et al. | D10/42 |
| D959,997 S | 8/2022 | Jones et al. | D10/42 |
| D960,400 S | 8/2022 | Ding | D26/24 |
| D962,239 S | 8/2022 | Arenas de Jesus et al. | D14/420 |
| 11,423,776 B2 | 8/2022 | Schwarz et al. | G06G 1/017 |
| 11,430,027 B2 | 8/2022 | King et al. | G06Q 30/02 |
| 11,436,649 B2 | 9/2022 | King et al. | G06Q 30/02 |
| 11,462,109 B2 | 10/2022 | King et al. | G06Q 30/00 |
| 11,475,491 B2 | 10/2022 | King et al. | G06Q 30/02 |
| D971,033 S | 11/2022 | King et al. | D10/42 |
| D971,034 S | 11/2022 | King et al. | D10/42 |
| D971,035 S | 11/2022 | King et al. | D10/42 |
| D976,516 S | 1/2023 | Nelson et al. | D99/28 |
| D986,082 S | 5/2023 | Jones et al. | D10/42 |
| D986,084 S | 5/2023 | Jones et al. | D10/104.1 |
| D987,444 S | 5/2023 | King et al. | D10/42 |
| 11,670,835 B2 | 6/2023 | Mackay et al. | |
| 11,683,617 B2 | 6/2023 | King et al. | H04Q 9/00 |
| 11,688,277 B2 | 6/2023 | Schwarz et al. | G08G 1/017 |
| 11,699,321 B2 | 7/2023 | Mackay et al. | |
| D996,237 S | 8/2023 | Jones et al. | D10/42 |
| 11,764,593 B2 | 9/2023 | Hunter et al. | H02J 7/0044 |
| 11,776,022 B2 | 10/2023 | King et al. | G06Q 30/0284 |
| D1,011,933 S | 1/2024 | Jones et al. | |
| D1,021,641 S | 4/2024 | King et al. | |
| D1,021,642 S | 4/2024 | King et al. | |
| 11,978,300 B2 | 5/2024 | Mackay et al. | |
| 11,984,024 B2 | 5/2024 | Schwarz et al. | |
| 11,991,491 B2 | 5/2024 | King et al. | |
| 12,008,856 B2 | 6/2024 | Mackay et al. | |
| 12,131,589 B2 | 10/2024 | King et al. | |
| 2001/0012241 A1 | 8/2001 | Dee et al. | 368/90 |
| 2001/0027626 A1 | 10/2001 | Natelli, Jr. | 52/170 |
| 2001/0037928 A1 | 11/2001 | Bench et al. | G06F 7/00 |
| 2001/0047278 A1 | 11/2001 | Brookner et al. | 705/1 |
| 2001/0051531 A1* | 12/2001 | Singhal | G07F 17/0014 194/902 |
| 2002/0008639 A1 | 1/2002 | Dee | 340/932.2 |
| 2002/0030606 A1 | 3/2002 | Chauvin et al. | 340/932.2 |
| 2002/0062172 A1 | 5/2002 | Bench et al. | 700/232 |
| 2002/0063035 A1 | 5/2002 | Blad et al. | G07F 9/06 |
| 2002/0074344 A1 | 6/2002 | Long et al. | 222/71 |
| 2002/0080013 A1 | 6/2002 | Anderson, III et al. | 340/425.5 |
| 2002/0100810 A1 | 8/2002 | Amadeo | G06K 19/06 |
| 2002/0109609 A1 | 8/2002 | Potter et al. | 340/932.2 |
| 2002/0109610 A1 | 8/2002 | Katz | 340/932.2 |
| 2002/0109611 A1 | 8/2002 | Howard | 340/932.2 |
| 2002/0111768 A1 | 8/2002 | Ghorayeb et al. | 702/178 |
| 2002/0134645 A1 | 9/2002 | Alexander et al. | 194/351 |
| 2002/0194793 A1 | 12/2002 | Bowron | |
| 2003/0010821 A1 | 1/2003 | Silberberg | 235/382 |
| 2003/0017904 A1 | 1/2003 | Lee | 475/232 |
| 2003/0092387 A1 | 5/2003 | Hjelmvik | 455/41 |
| 2003/0112151 A1 | 6/2003 | Chauvin et al. | 340/870.02 |
| 2003/0112597 A1 | 6/2003 | Smith | 361/685 |
| 2003/0117904 A1 | 6/2003 | Lank et al. | |
| 2003/0121754 A1 | 7/2003 | King | 194/302 |
| 2003/0128010 A1 | 7/2003 | Hsu | 320/101 |
| 2003/0128136 A1 | 7/2003 | Spier et al. | 340/932.2 |
| 2003/0132292 A1 | 7/2003 | Gomez et al. | G06K 15/00 |
| 2003/0132840 A1 | 7/2003 | Bahar | 340/541 |
| 2003/0135407 A1 | 7/2003 | Reinhardt et al. | 705/13 |
| 2003/0140531 A1 | 7/2003 | Pippins | 37/456 |
| 2003/0144905 A1 | 7/2003 | Smith | 705/14 |
| 2003/0144972 A1 | 7/2003 | Cordery et al. | 705/401 |
| 2003/0169183 A1 | 9/2003 | Korepanov et al. | 340/932.2 |
| 2003/0179107 A1 | 9/2003 | Kibria et al. | 340/932.2 |
| 2003/0220835 A1 | 11/2003 | Barnes, Jr. | 705/14 |
| 2003/0222792 A1 | 12/2003 | Berman et al. | 340/932.2 |
| 2003/0229793 A1 | 12/2003 | McCall et al. | H04L 9/00 |
| 2003/0234888 A1 | 12/2003 | Hong et al. | 348/375 |
| 2004/0011099 A1 | 1/2004 | Andersson | 70/371 |
| 2004/0016796 A1 | 1/2004 | Hanna et al. | 235/375 |
| 2004/0030601 A1 | 2/2004 | Pond et al. | |
| 2004/0039632 A1 | 2/2004 | Han et al. | 705/13 |
| 2004/0040028 A1 | 2/2004 | Moreau | 719/310 |
| 2004/0059693 A1 | 3/2004 | Hausen et al. | G07B 15/02 |
| 2004/0068434 A1 | 4/2004 | Kanekon | |
| 2004/0084278 A1 | 5/2004 | Harris et al. | 194/302 |
| 2004/0094619 A1 | 5/2004 | Silberberg | 235/382 |
| 2004/0160905 A1 | 8/2004 | Bernier et al. | 370/310 |
| 2004/0160906 A1 | 8/2004 | Greszczuk et al. | 370/311 |
| 2004/0181496 A1 | 9/2004 | Odinotski et al. | 705/418 |
| 2004/0207530 A1 | 10/2004 | Nielsen | G08B 21/00 |
| 2004/0232878 A1 | 11/2004 | Couch et al. | 320/101 |
| 2004/0243526 A1 | 12/2004 | Krygler et al. | 705/418 |
| 2004/0254840 A1 | 12/2004 | Slemmer et al. | 705/22 |
| 2004/0254900 A1 | 12/2004 | Reinhard | 705/418 |
| 2004/0262379 A1 | 12/2004 | Gomes | 235/379 |
| 2004/0263117 A1 | 12/2004 | Kogan et al. | 320/114 |
| 2004/0264302 A1 | 12/2004 | Ward, II | 368/90 |
| 2005/0001779 A1 | 1/2005 | Copeland | 343/867 |
| 2005/0029340 A1 | 2/2005 | Ferraro | 235/379 |
| 2005/0035740 A1 | 2/2005 | Elder et al. | 320/116 |
| 2005/0040951 A1 | 2/2005 | Zalewski et al. | 340/572.1 |
| 2005/0068201 A1 | 3/2005 | Wulff et al. | 341/20 |
| 2005/0099320 A1 | 5/2005 | Nath et al. | 340/933 |
| 2005/0102075 A1 | 5/2005 | Dar et al. | 701/29 |
| 2005/0155839 A1 | 7/2005 | Banks et al. | 194/302 |
| 2005/0168352 A1 | 8/2005 | Tomer | 340/932.2 |
| 2005/0178639 A1 | 8/2005 | Brumfield et al. | 194/350 |
| 2005/0192911 A1 | 9/2005 | Mattern | 705/401 |
| 2005/0216354 A1 | 9/2005 | Bam et al. | 705/26 |
| 2005/0226201 A1 | 10/2005 | McMilliin | 370/348 |
| 2006/0020487 A1 | 1/2006 | Spittel et al. | 705/1 |
| 2006/0021848 A1 | 2/2006 | Smith | 194/350 |
| 2006/0028919 A1 | 2/2006 | Mitschele | G04F 3/00 |
| 2006/0052055 A1 | 3/2006 | Rowse et al. | 455/41.1 |
| 2006/0072286 A1 | 4/2006 | Tseng | 361/679.22 |
| 2006/0114159 A1 | 6/2006 | Yoshikawa et al. | |
| 2006/0116972 A1 | 6/2006 | Wong | 705/418 |
| 2006/0136131 A1 | 6/2006 | Dugan et al. | 701/300 |
| 2006/0149684 A1 | 7/2006 | Matsuura et al. | 705/65 |
| 2006/0152349 A1 | 7/2006 | Ratnakar | 340/426.1 |
| 2006/0152385 A1 | 7/2006 | Mandy | 340/932.2 |
| 2006/0173733 A1 | 8/2006 | Fancher | 705/13 |
| 2006/0227010 A1 | 10/2006 | Berstis et al. | G08G 1/14 |
| 2006/0255119 A1 | 11/2006 | Marchasin et al. | 235/375 |
| 2006/0259354 A1 | 11/2006 | Yan | 705/13 |
| 2006/0267799 A1 | 11/2006 | Mendelson | 340/932.2 |
| 2007/0011700 A1 | 1/2007 | Johnson | 725/34 |
| 2007/0016539 A1 | 1/2007 | Groft et al. | 705/418 |
| 2007/0017265 A1 | 1/2007 | Andersson | 70/379 |
| 2007/0029825 A1 | 2/2007 | Franklin et al. | 293/128 |
| 2007/0040449 A1 | 2/2007 | Spurlin et al. | 307/64 |
| 2007/0044523 A1 | 3/2007 | Davis | 70/34 |
| 2007/0046651 A1 | 3/2007 | Sinclair et al. | 345/173 |
| 2007/0061155 A1 | 3/2007 | Ji et al. | 705/1 |
| 2007/0074702 A1 | 4/2007 | Nakamura et al. | 123/299 |
| 2007/0094153 A1 | 4/2007 | Ferraro | 705/67 |
| 2007/0114849 A1 | 5/2007 | Falik et al. | 307/64 |
| 2007/0119682 A1 | 5/2007 | Banks et al. | 194/239 |
| 2007/0129974 A1 | 6/2007 | Chen et al. | 705/5 |
| 2007/0136128 A1 | 6/2007 | Janacek et al. | 705/13 |
| 2007/0171069 A1 | 7/2007 | Allen | 340/572.1 |
| 2007/0184852 A1 | 8/2007 | Johnson et al. | 455/456.1 |
| 2007/0189907 A1 | 8/2007 | Kunihiro et al. | 417/44.2 |

(56) References Cited

U.S. PATENT DOCUMENTS

| | | | |
|---|---|---|---|
| 2007/0208499 A1 | 9/2007 | Kwong | 701/117 |
| 2007/0210935 A1 | 9/2007 | Yost et al. | 340/932.2 |
| 2007/0276724 A1 | 11/2007 | Catt | 705/13 |
| 2007/0285281 A1 | 12/2007 | Welch | 340/932.2 |
| 2008/0052254 A1 | 2/2008 | Al Amri | 705/418 |
| 2008/0061967 A1 | 3/2008 | Corrado | G08B 13/14 |
| 2008/0071611 A1 | 3/2008 | Lovett | 705/13 |
| 2008/0093454 A1 | 4/2008 | Yamazaki et al. | |
| 2008/0147268 A1 | 6/2008 | Fuller | 701/35 |
| 2008/0158010 A1 | 7/2008 | Nath et al. | 340/932.2 |
| 2008/0165030 A1 | 7/2008 | Kuo et al. | 340/932.2 |
| 2008/0208680 A1 | 8/2008 | Cho | 705/13 |
| 2008/0218383 A1 | 9/2008 | Franklin et al. | 340/937 |
| 2008/0238715 A1 | 10/2008 | Cheng et al. | 340/870.03 |
| 2008/0245638 A1 | 10/2008 | King et al. | 194/350 |
| 2008/0257965 A1 | 10/2008 | Klein et al. | 235/483 |
| 2008/0265019 A1 | 10/2008 | Artino et al. | 235/379 |
| 2008/0266138 A1 | 10/2008 | Ponert | 340/932.2 |
| 2008/0270227 A1 | 10/2008 | Al Amri | 705/13 |
| 2008/0277468 A1 | 11/2008 | Mitschele | 235/384 |
| 2008/0289030 A1* | 11/2008 | Poplett | G06F 21/31 726/14 |
| 2008/0291054 A1 | 11/2008 | Groft | 340/932.2 |
| 2008/0296365 A1 | 12/2008 | Schliebe | 235/379 |
| 2008/0319837 A1 | 12/2008 | Mitschele | 705/13 |
| 2009/0026842 A1 | 1/2009 | Hunter et al. | 307/66 |
| 2009/0032368 A1 | 2/2009 | Hunter et al. | 194/318 |
| 2009/0049875 A1 | 2/2009 | Buhl et al. | 70/52 |
| 2009/0057398 A1 | 3/2009 | Douglass et al. | 235/379 |
| 2009/0083149 A1 | 3/2009 | Maekawa et al. | 705/14 |
| 2009/0095593 A1 | 4/2009 | King et al. | 194/302 |
| 2009/0099761 A1 | 4/2009 | Davis et al. | 701/120 |
| 2009/0102726 A1 | 4/2009 | Imano et al. | |
| 2009/0109062 A1 | 4/2009 | An | 340/932.2 |
| 2009/0121889 A1 | 5/2009 | Lin et al. | G08B 21/00 |
| 2009/0137204 A1 | 5/2009 | Chang | 455/41.1 |
| 2009/0146796 A1 | 6/2009 | Goto et al. | H04Q 5/22 |
| 2009/0159674 A1* | 6/2009 | King | G07B 15/02 235/382 |
| 2009/0174528 A1 | 7/2009 | Toda et al. | H04Q 5/22 |
| 2009/0177580 A1 | 7/2009 | Lowenthal et al. | 705/39 |
| 2009/0183966 A1 | 7/2009 | King et al. | 194/217 |
| 2009/0192950 A1* | 7/2009 | King | G07B 15/02 340/568.1 |
| 2009/0199966 A1 | 8/2009 | Coleman et al. | |
| 2009/0254438 A1 | 10/2009 | Johnson, Jr. et al. | 705/17 |
| 2009/0256707 A1 | 10/2009 | Uschold | 340/568.1 |
| 2009/0267732 A1 | 10/2009 | Chauvin et al. | 340/5.53 |
| 2009/0284907 A1 | 11/2009 | Regimbal et al. | 361/679.02 |
| 2009/0287578 A1 | 11/2009 | Paluszek et al. | 705/17 |
| 2009/0315720 A1 | 12/2009 | Clement et al. | 340/573.5 |
| 2010/0019936 A1 | 1/2010 | Kaveler | 340/933 |
| 2010/0025459 A1 | 2/2010 | Yamada | 235/375 |
| 2010/0026522 A1 | 2/2010 | Ward, II | 340/932.2 |
| 2010/0030629 A1 | 2/2010 | Ward, II | 705/13 |
| 2010/0032266 A1 | 2/2010 | Stephan | 200/4 |
| 2010/0060479 A1 | 3/2010 | Salter | 340/870 |
| 2010/0103100 A1 | 4/2010 | Yamamoto | 345/158 |
| 2010/0106517 A1 | 4/2010 | Kociubinski et al. | 705/2 |
| 2010/0116883 A1 | 5/2010 | Cost et al. | 235/381 |
| 2010/0153193 A1 | 6/2010 | Ashby et al. | 705/13 |
| 2010/0161489 A1 | 6/2010 | Goodall et al. | 705/45 |
| 2010/0168694 A1 | 7/2010 | Gakhar et al. | A61F 13/42 |
| 2010/0187300 A1 | 7/2010 | Ramachandran et al. | 235/379 |
| 2010/0188932 A1 | 7/2010 | Hanks et al. | 367/140 |
| 2010/0224682 A1 | 9/2010 | Busch-Sorensen | |
| 2010/0241564 A1 | 9/2010 | Miller et al. | 705/43 |
| 2010/0243729 A1 | 9/2010 | Russell et al. | 235/379 |
| 2010/0328104 A1 | 12/2010 | Groft | 340/932.2 |
| 2010/0332394 A1 | 12/2010 | Ioli | 705/44 |
| 2011/0015934 A1 | 1/2011 | Rowe et al. | G06Q 30/00 |
| 2011/0022427 A1 | 1/2011 | Dayan | 705/5 |
| 2011/0037562 A1* | 2/2011 | Braukmann | G06F 3/04142 340/5.9 |
| 2011/0057815 A1 | 3/2011 | King et al. | 340/932.2 |
| 2011/0060653 A1 | 3/2011 | King et al. | 705/14.58 |
| 2011/0062230 A1 | 3/2011 | Ward, II et al. | 235/377 |
| 2011/0063133 A1 | 3/2011 | Keller et al. | 340/932.2 |
| 2011/0066297 A1 | 3/2011 | Saberi et al. | 700/287 |
| 2011/0079564 A1 | 4/2011 | Palmer | A47F 7/00 |
| 2011/0093314 A1* | 4/2011 | Redmann | G06Q 20/14 705/13 |
| 2011/0106329 A1 | 5/2011 | Donnelly et al. | 700/291 |
| 2011/0122036 A1* | 5/2011 | Leung | H01Q 9/0485 343/785 |
| 2011/0133613 A1 | 6/2011 | Descamps et al. | 312/223.1 |
| 2011/0158331 A1 | 6/2011 | Kavaler et al. | 375/259 |
| 2011/0203901 A1 | 8/2011 | King et al. | 194/211 |
| 2011/0204847 A1 | 8/2011 | Turner | H02J 7/00 |
| 2011/0205087 A1 | 8/2011 | Kell et al. | 340/932.2 |
| 2011/0210827 A1 | 9/2011 | Lidror | H04Q 5/22 |
| 2011/0213656 A1 | 9/2011 | Turner | 705/14.49 |
| 2011/0218940 A1 | 9/2011 | Bergstrom et al. | 705/418 |
| 2011/0221624 A1 | 9/2011 | Kavaler | 342/22 |
| 2011/0222957 A1 | 9/2011 | Marques Lito Velez Grilo | F16B 5/02 |
| 2011/0241604 A1 | 10/2011 | Anderson | H01M 10/46 |
| 2011/0261548 A1 | 10/2011 | Gandhi | |
| 2011/0276519 A1 | 11/2011 | MacKay et al. | 705/418 |
| 2011/0289985 A1 | 12/2011 | MacKay et al. | 70/1.5 |
| 2011/0313822 A1 | 12/2011 | Burdick | 705/13 |
| 2011/0316716 A1 | 12/2011 | MacKay et al. | 340/870.02 |
| 2011/0320243 A1 | 12/2011 | Khan | 705/13 |
| 2011/0320256 A1 | 12/2011 | Florucci et al. | 705/14.33 |
| 2012/0026015 A1 | 2/2012 | Kavaler | 340/933 |
| 2012/0073222 A1 | 3/2012 | Sargentini | 52/235 |
| 2012/0078686 A1 | 3/2012 | Bashani | 705/13 |
| 2012/0084210 A1 | 4/2012 | Farahmand | 705/64 |
| 2012/0092528 A1 | 4/2012 | Jung et al. | H04N 5/262 |
| 2012/0143657 A1 | 6/2012 | Silberberg | G08G 1/14 |
| 2012/0158466 A1 | 6/2012 | John | 705/13 |
| 2012/0173171 A1 | 7/2012 | Bajwa et al. | 702/56 |
| 2012/0185325 A1 | 7/2012 | Shani | 705/14.43 |
| 2012/0197806 A1 | 8/2012 | Hill | 705/67 |
| 2012/0208521 A1 | 8/2012 | Hager et al. | 455/422.1 |
| 2012/0213351 A1 | 8/2012 | Boyce et al. | 379/167.01 |
| 2012/0222935 A1 | 9/2012 | Mackay et al. | |
| 2012/0223841 A1 | 9/2012 | Chauvin et al. | 340/870.02 |
| 2012/0254040 A1 | 10/2012 | Dixon et al. | |
| 2012/0255333 A1 | 10/2012 | MacKay et al. | 70/357 |
| 2012/0273322 A1* | 11/2012 | Mackay | G06Q 20/3278 194/344 |
| 2012/0285790 A1 | 11/2012 | Jones et al. | 194/217 |
| 2012/0285791 A1 | 11/2012 | Jones et al. | 194/217 |
| 2012/0285792 A1 | 11/2012 | Jones et al. | 194/217 |
| 2012/0285793 A1 | 11/2012 | Jones et al. | 194/217 |
| 2012/0286036 A1 | 11/2012 | Jones et al. | 235/380 |
| 2012/0286968 A1 | 11/2012 | Jones et al. | 340/870.02 |
| 2012/0292385 A1* | 11/2012 | MacKay | G07F 17/248 235/375 |
| 2012/0298019 A1 | 11/2012 | Maniaci | |
| 2013/0005445 A1 | 1/2013 | Walker et al. | 463/25 |
| 2013/0016952 A1 | 1/2013 | Knuth | 385/135 |
| 2013/0027218 A1 | 1/2013 | Schwarz et al. | 340/870.02 |
| 2013/0085928 A1 | 4/2013 | Mckinney | 705/39 |
| 2013/0086375 A1 | 4/2013 | Lyne et al. | |
| 2013/0099943 A1 | 4/2013 | Subramanya | 340/933 |
| 2013/0124270 A1 | 5/2013 | Tziperman et al. | 705/13 |
| 2013/0124320 A1 | 5/2013 | Karner | G06Q 30/02 |
| 2013/0143536 A1 | 6/2013 | Ratti | H04W 4/003 |
| 2013/0231985 A1 | 9/2013 | MacKay et al. | G06Q 50/30 |
| 2013/0238406 A1 | 9/2013 | King et al. | 705/13 |
| 2013/0257589 A1 | 10/2013 | Mohiuddin et al. | G08C 17/02 |
| 2013/0262275 A1 | 10/2013 | Outwater et al. | G06Q 20/40 |
| 2013/0285455 A1 | 10/2013 | Hunter et al. | 307/66 |
| 2013/0293482 A1 | 11/2013 | Burns et al. | |
| 2014/0040028 A1 | 2/2014 | King et al. | 705/14.53 |
| 2014/0041301 A1 | 2/2014 | Oakley et al. | 49/14 |
| 2014/0058805 A1 | 2/2014 | Paesler et al. | 705/13 |
| 2014/0108107 A1 | 4/2014 | Jones et al. | 705/13 |
| 2014/0129158 A1 | 5/2014 | Shea | 702/57 |
| 2014/0139360 A1 | 5/2014 | Vilajosana Guillen et al. | G08G 1/14 |
| 2014/0165885 A1 | 6/2014 | Denny | E05G 1/024 |

(56) References Cited

U.S. PATENT DOCUMENTS

| | | | |
|---|---|---|---|
| 2014/0172518 A1 | 6/2014 | King et al. ........................ 705/13 | |
| 2014/0174880 A1 | 6/2014 | MacKay et al. ........ G07F 1/043 | |
| 2014/0174881 A1 | 6/2014 | King et al. ..................... 194/350 | |
| 2014/0196387 A1 | 7/2014 | Neito et al. | |
| 2014/0210646 A1 | 7/2014 | Subramanya ................. 340/928 | |
| 2014/0213176 A1 | 7/2014 | Mendelson ...................... 455/39 | |
| 2014/0214499 A1 | 7/2014 | Hudson et al. ................. 705/13 | |
| 2014/0214500 A1 | 7/2014 | Hudson et al. ..... G06Q 30/0284 | |
| 2014/0218527 A1 | 8/2014 | Subramanya ........ G08G 1/143 | |
| 2014/0229246 A1 | 8/2014 | Ghaffari ............. G06K 19/0723 | |
| 2014/0231505 A1 | 8/2014 | King et al. ..................... 235/375 | |
| 2014/0257943 A1 | 9/2014 | Nerayoff et al. ..... G06T 7/2093 | |
| 2014/0279565 A1 | 9/2014 | Trump et al. .................... 705/72 | |
| 2014/0289025 A1 | 9/2014 | King et al. ........................ 705/13 | |
| 2014/0319211 A1 | 10/2014 | MacKay et al. ............... 235/380 | |
| 2014/0344891 A1 | 11/2014 | Mullick et al. ...... H04L 63/0272 | |
| 2015/0000511 A1 | 1/2015 | Engl ......................... F41H 5/26 | |
| 2015/0029041 A1 | 1/2015 | Liu et al. .................... G08F 1/14 | |
| 2015/0045984 A1 | 2/2015 | Hui et al. .............. B60W 50/08 | |
| 2015/0068827 A1 | 3/2015 | Makitalo et al. ....... B62M 27/02 | |
| 2015/0084786 A1 | 3/2015 | King et al. .................. 340/870.02 | |
| 2015/0106172 A1 | 4/2015 | Salama ................. G07F 17/246 | |
| 2015/0120336 A1 | 4/2015 | Grokop et al. ......... G06Q 40/08 | |
| 2015/0129391 A1 | 5/2015 | Jones et al. ............. G07F 17/24 | |
| 2015/0134460 A1 | 5/2015 | Tian et al. ............. G06Q 30/02 | |
| 2015/0160761 A1 | 6/2015 | Lee et al. | |
| 2015/0179070 A1 | 6/2015 | Sanbrook ................. G08G 1/14 | |
| 2015/0191178 A1 | 7/2015 | Roy et al. ............. B60W 40/09 | |
| 2015/0215375 A1 | 7/2015 | Hundt et al. | |
| 2015/0235503 A1 | 8/2015 | King et al. | |
| 2015/0242605 A1 | 8/2015 | Du et al. ................... G06F 21/31 | |
| 2015/0278969 A1 | 10/2015 | Benoy et al. ........... G06Q 50/10 | |
| 2015/0283902 A1 | 10/2015 | Tuukkanen ............ B60K 35/00 | |
| 2015/0288713 A1 | 10/2015 | Lawrence et al. ....... H04L 29/06 | |
| 2015/0288932 A1 | 10/2015 | Smith et al. ........... H04N 7/183 | |
| 2015/0294526 A1 | 10/2015 | Vogt ........................ G07F 17/24 | |
| 2015/0302057 A1 | 10/2015 | Kealey et al. ........... G06F 17/30 | |
| 2015/0332587 A1 | 11/2015 | Schwarz et al. ........ G08G 1/017 | |
| 2015/0333598 A1 | 11/2015 | Conticchio et al. . H02K 7/1876 | |
| 2015/0341241 A1 | 11/2015 | Robertson ........... H04L 43/0811 | |
| 2015/0356604 A1 | 12/2015 | Kim et al. ............. G06Q 30/02 | |
| 2015/0371483 A1 | 12/2015 | Sun ....................... G07F 17/248 | |
| 2015/0376891 A1 | 12/2015 | Laurindo .................. E04B 1/28 | |
| 2016/0001782 A1 | 1/2016 | Fiedler ................... B60W 40/09 | |
| 2016/0012418 A1 | 1/2016 | MacKay et al. ...... G06Q 20/352 | |
| 2016/0012602 A1 | 1/2016 | Xu et al. ................ G06T 7/0075 | |
| 2016/0040699 A1 | 2/2016 | Nayar ................... F16B 5/0225 | |
| 2016/0055322 A1 | 2/2016 | Thomas .................. G06F 21/10 | |
| 2016/0069557 A1 | 3/2016 | Rueckgauer ............ F21V 25/12 | |
| 2016/0086397 A1 | 3/2016 | Phillips .................... G07C 5/08 | |
| 2016/0133085 A1 | 5/2016 | Eagon et al. ............ G07F 17/24 | |
| 2016/0163119 A1 | 6/2016 | Bashani ................. G07B 15/00 | |
| 2016/0267340 A1 | 9/2016 | Jensen ............... G06K 9/00926 | |
| 2016/0268838 A1 | 9/2016 | Hunter et al. ........... H02J 9/061 | |
| 2016/0321714 A1 | 11/2016 | King et al. ........... G06Q 30/0284 | |
| 2016/0357991 A1 | 12/2016 | Hershman et al. | |
| 2016/0371915 A1 | 12/2016 | MacKay et al. ........ G07F 1/042 | |
| 2017/0031464 A1 | 2/2017 | Montero | |
| 2017/0032485 A1 | 2/2017 | Vemury ................ G06Q 50/26 | |
| 2017/0032582 A1 | 2/2017 | Moran et al. ........... G07B 15/02 | |
| 2017/0034600 A1 | 2/2017 | King et al. .............. H04Q 9/00 | |
| 2017/0083043 A1 | 3/2017 | Bowers et al. ........ G06F 1/1601 | |
| 2017/0094517 A1 | 3/2017 | Jakobsson ............. H04Q 12/06 | |
| 2017/0096123 A1 | 4/2017 | Gennermann et al. ..................... B60R 25/24 | |
| 2017/0098339 A1 | 4/2017 | Keller et al. ............ G07F 17/24 | |
| 2017/0116857 A1 | 4/2017 | Moran et al. ............ G08G 1/14 | |
| 2017/0148230 A1 | 5/2017 | Richard ................ G07B 15/02 | |
| 2017/0154368 A1 | 6/2017 | Jones et al. ........ G06Q 30/0284 | |
| 2017/0168155 A1 | 6/2017 | Richard ................ G01S 13/86 | |
| 2017/0186054 A1 | 6/2017 | Fish et al. ............. G06Q 30/02 | |
| 2017/0193734 A1 | 7/2017 | King et al. .......... G07F 17/0021 | |
| 2017/0197586 A1 | 7/2017 | Kawamura et al. .... B60R 25/24 | |
| 2017/0206716 A1 | 7/2017 | King et al. ............. G07B 15/02 | |
| 2017/0213262 A1 | 7/2017 | Kelley, II et al. ..... G06Q 30/02 | |
| 2017/0256983 A1 | 9/2017 | Hunter et al. ........... H02J 9/061 | |
| 2017/0262882 A1 | 9/2017 | Shina ..................... G06Q 30/02 | |
| 2017/0299400 A1 | 10/2017 | Joung et al. ............ G01C 21/36 | |
| 2017/0320501 A1 | 11/2017 | Li et al. ................. B60W 50/08 | |
| 2017/0323227 A1 | 11/2017 | Sadeghi ................. G06Q 10/02 | |
| 2017/0323513 A1 | 11/2017 | Jones ..................... G07F 17/246 | |
| 2017/0325082 A1 | 11/2017 | Rowe et al. ............. H04W 4/18 | |
| 2017/0369071 A1 | 12/2017 | Gould et al. ........... B60W 50/00 | |
| 2018/0018179 A1 | 1/2018 | Scheufler et al. ......... G06F 9/44 | |
| 2018/0025549 A1 | 1/2018 | King et al. ............. G07B 15/02 | |
| 2018/0025550 A1 | 1/2018 | Hudson et al. ........ G07B 15/02 | |
| 2018/0025629 A1 | 1/2018 | Schwarz et al. ........ G08G 1/017 | |
| 2018/0061172 A1 | 3/2018 | MacKay et al. ........ G07F 17/24 | |
| 2018/0068337 A1 | 3/2018 | Fiorucci et al. ... G06Q 30/0226 | |
| 2018/0082488 A1 | 3/2018 | King et al. ............. G07B 15/02 | |
| 2018/0082489 A1 | 3/2018 | King et al. ............. G07B 15/02 | |
| 2018/0082490 A1 | 3/2018 | King et al. ............. G07B 15/02 | |
| 2018/0160282 A1 | 6/2018 | Van de Poll ............. G06K 9/00 | |
| 2018/0225908 A1 | 8/2018 | MacKay et al. ........ G07F 17/24 | |
| 2018/0225909 A1 | 8/2018 | MacKay ................. G07F 17/24 | |
| 2018/0322534 A1 | 11/2018 | King et al. ......... G06Q 30/0268 | |
| 2018/0339708 A1 | 11/2018 | Geller ..................... B60W 30/18 | |
| 2018/0342165 A1 | 11/2018 | Sweeney et al. ......... G08G 1/00 | |
| 2018/0350185 A1 | 12/2018 | King et al. .......... G07F 17/0021 | |
| 2019/0062914 A1 | 2/2019 | King et al. ............. C23C 16/455 | |
| 2019/0066424 A1 | 2/2019 | Hassani et al. ........... G07C 9/00 | |
| 2019/0073837 A1 | 3/2019 | Oliver ................... G07B 15/02 | |
| 2019/0114869 A1 | 4/2019 | MacKay et al. ........ G07F 17/24 | |
| 2019/0131819 A1 | 5/2019 | Bell ........................... H02J 7/35 | |
| 2019/0220011 A1 | 7/2019 | Della Penna ............ G05D 1/00 | |
| 2019/0227954 A1 | 7/2019 | Shi ........................... G06F 13/10 | |
| 2019/0251608 A1 | 8/2019 | King et al. ............. G06Q 30/02 | |
| 2019/0272680 A1 | 9/2019 | King et al. ............. G07B 15/02 | |
| 2019/0272681 A1 | 9/2019 | King et al. ............. G07B 15/02 | |
| 2019/0304203 A1 | 10/2019 | King et al. ............. G07B 15/02 | |
| 2019/0362383 A1 | 11/2019 | King et al. ............. G06Q 30/02 | |
| 2019/0370923 A1 | 12/2019 | Randall et al. ......... G06Q 50/30 | |
| 2019/0378368 A1 | 12/2019 | MacKay et al. ........ G07F 17/24 | |
| 2019/0385454 A1 | 12/2019 | King et al. ............. G08G 1/148 | |
| 2020/0059708 A1 | 2/2020 | King et al. .............. H04Q 9/00 | |
| 2020/0136229 A1 | 4/2020 | MacKay et al. ........ H01Q 1/22 | |
| 2020/0153270 A1 | 5/2020 | Hunter et al. ........... H02J 9/061 | |
| 2020/0160263 A1 | 5/2020 | Kuettner ................ G06Q 10/08 | |
| 2020/0276503 A1 | 9/2020 | Marchiorello ........ A63F 13/798 | |
| 2020/0310528 A1 | 10/2020 | Upmanue et al. ......... G06F 3/01 | |
| 2020/0327801 A1 | 10/2020 | Schwarz et al. ........ G08G 1/017 | |
| 2020/0334581 A1 | 10/2020 | Skaling ................. G06Q 10/02 | |
| 2020/0349666 A1 | 11/2020 | Hodge et al. ........... G06Q 50/30 | |
| 2020/0364967 A1 | 11/2020 | Spice ........................ G07F 7/08 | |
| 2021/0065263 A1 | 3/2021 | King et al. ............. G06Q 30/02 | |
| 2021/0067846 A1 | 3/2021 | King et al. .............. H04Q 9/00 | |
| 2021/0319485 A1 | 10/2021 | King et al. ............. G06Q 30/02 | |
| 2021/0344218 A1 | 11/2021 | Hunter et al. ............. H02J 9/06 | |
| 2021/0407348 A1 | 12/2021 | King et al. .............. G09F 23/00 | |
| 2022/0030335 A1 | 1/2022 | King et al. .............. H04Q 9/00 | |
| 2022/0076303 A1 | 3/2022 | King et al. ............. G06Q 30/02 | |
| 2022/0076304 A1 | 3/2022 | King et al. ............. G06Q 30/02 | |
| 2022/0076305 A1 | 3/2022 | King et al. ............. G06Q 30/02 | |
| 2023/0005369 A1 | 1/2023 | King et al. ............. G08G 1/148 | |
| 2023/0057773 A1 | 2/2023 | King et al. ............. G07B 15/02 | |
| 2023/0072870 A1 | 3/2023 | Marvi et al. ............ F16L 55/32 | |
| 2023/0274635 A1 | 8/2023 | Schwarz et al. ........ G08G 1/017 | |
| 2023/0360530 A1 | 11/2023 | King et al. | |
| 2024/0064441 A1 | 2/2024 | King et al. | |

FOREIGN PATENT DOCUMENTS

| | | | |
|---|---|---|---|
| AU | 200227724 | 1/2003 | ............... G07C 1/30 |
| AU | 2006203554 | 9/2006 | ............... G07C 1/30 |
| AU | 314132 | 5/2007 | |
| AU | 315845 | 8/2007 | |
| AU | 315846 | 8/2007 | |
| AU | 315847 | 8/2007 | |
| CA | 2233931 | 4/1997 | ............. G08G 1/14 |
| CA | 2260925 | 1/1998 | ............. G07B 15/00 |
| CA | 2186406 | 3/1998 | ............. G07C 1/30 |
| CA | 2227833 | 7/1998 | ............. G07F 17/24 |
| CA | 2346908 | 4/2000 | ............. G07C 1/30 |
| CA | 2352968 | 1/2001 | ............. G07F 17/24 |

(56) References Cited

FOREIGN PATENT DOCUMENTS

| | | | |
|---|---|---|---|
| CA | 2373400 | 8/2001 | ............ G07F 5/04 |
| CA | 2401429 | 9/2001 | ............ G07C 1/30 |
| CA | 2377010 | 12/2001 | ............ G06F 19/00 |
| CA | 2357179 | 3/2002 | ............ G08C 17/00 |
| CA | 2437722 | 8/2002 | ............ G08G 1/14 |
| CA | 2453369 | 1/2003 | ............ G07C 1/30 |
| CA | 2363915 | 5/2003 | ............ G07F 17/24 |
| CA | 2413198 | 5/2003 | ............ G07F 17/24 |
| CA | 2414132 | 6/2003 | ............ G07F 17/24 |
| CA | 2302922 | 1/2004 | ............ G07D 5/08 |
| CA | 2443677 | 10/2004 | ............ G08G 1/00 |
| CA | 2248347 | 10/2005 | ............ G07C 1/30 |
| CA | 2595309 | 7/2006 | ............ G08G 1/14 |
| CA | 2511461 | 2/2007 | ............ G07C 1/30 |
| CA | 2631699 | 6/2007 | ............ G06Q 10/00 |
| CA | 2622164 | 8/2008 | ............ G07F 17/24 |
| CA | 122930 | 9/2008 | |
| CA | 126745 | 9/2008 | |
| CA | 2693911 | 1/2009 | ............ G06Q 50/00 |
| CA | 2650192 | 7/2009 | ............ G08C 17/02 |
| CA | 2650195 | 7/2009 | ............ G01D 4/02 |
| CA | 2650195 C | 7/2009 | ............ G01D 4/02 |
| CA | 2933066 | 7/2009 | ............ G07F 17/24 |
| CA | 2387540 | 4/2010 | ............ G07F 17/24 |
| CA | 134041 | 9/2010 | |
| CA | 134042 | 9/2010 | |
| CA | 2773132 | 3/2011 | ............ G06Q 30/00 |
| CA | 2773135 | 3/2011 | ............ G06Q 20/00 |
| CA | 2517717 | 1/2012 | ............ G07F 19/00 |
| CA | 2770093 | 5/2012 | ............ G07C 1/30 |
| CA | 2870544 | 5/2012 | ............ G07C 1/30 |
| CA | 2870592 | 5/2012 | ............ G07F 17/24 |
| CA | 2874155 | 5/2012 | ............ G07F 17/24 |
| CA | 2773250 | 9/2012 | ............ G07C 1/30 |
| CA | 142346 | 7/2013 | |
| CA | 145137 | 7/2013 | |
| CA | 155382 | 5/2015 | |
| CA | 155383 | 5/2015 | |
| CA | 155391 | 5/2015 | |
| CA | 156990 | 5/2015 | |
| CA | 156991 | 5/2015 | |
| CA | 156992 | 5/2015 | |
| CA | 156993 | 5/2015 | |
| CA | 156994 | 5/2015 | |
| CA | 156995 | 5/2015 | |
| CA | 157067 | 5/2015 | |
| CA | 157068 | 5/2015 | |
| CA | 157069 | 5/2015 | |
| CA | 161049 | 10/2015 | |
| CA | 160598 | 2/2016 | |
| CA | 163369 | 2/2016 | |
| CA | 163370 | 2/2016 | |
| CA | 2900177 | 2/2017 | ............ G07F 17/24 |
| CA | 2908793 | 2/2017 | ............ G07C 1/30 |
| CA | 2932667 | 2/2017 | ............ G07C 1/30 |
| CA | 168171 | 3/2017 | |
| CA | 168172 | 3/2017 | |
| CA | 168173 | 3/2017 | |
| CA | 168198 | 3/2017 | |
| CA | 168199 | 3/2017 | |
| CA | 168200 | 3/2017 | |
| CA | 171649 | 11/2017 | |
| CA | 171650 | 11/2017 | |
| CA | 171651 | 11/2017 | |
| CA | 171652 | 11/2017 | |
| CA | 171653 | 11/2017 | |
| CA | 171654 | 11/2017 | |
| CA | 3046774 | 12/2019 | ............ G06Q 20/32 |
| CA | 189362 | 6/2021 | |
| CA | 189363 | 6/2021 | |
| CA | 189364 | 6/2021 | |
| CA | 189365 | 6/2021 | |
| CA | 189366 | 6/2021 | |
| CN | 1037604 | 11/1989 | ............ G07C 1/30 |
| CN | 2331015 | 7/1999 | |
| CN | 2395344 | 9/2000 | ............ G07F 17/24 |
| CN | 2470887 | 1/2002 | ............ G07B 15/02 |
| CN | 2544352 | 4/2003 | ............ G06F 19/00 |
| CN | 1549990 | 11/2004 | ............ G07B 15/02 |
| CN | 201303054 | 9/2009 | ............ H01Q 7/06 |
| CN | 202217169 | 5/2012 | ............ G05B 19/414 |
| CN | 305987969 | 8/2020 | |
| DE | 28 04 085 A 1 | 2/1977 | |
| DE | 27 50 193 C 2 | 11/1977 | |
| DE | 102005041290 | 3/2007 | ............ G07B 15/02 |
| EM | 002416206-0001 | 3/2014 | |
| EM | 002416206-0002 | 3/2014 | |
| EM | 002416206-0003 | 3/2014 | |
| EM | 003076702-0001 | 4/2014 | |
| EM | 003076702-0002 | 4/2014 | |
| EM | 003076702-0003 | 4/2014 | |
| EM | 003076702-0004 | 4/2014 | |
| EM | 003076702-0005 | 4/2014 | |
| EM | 003076702-0006 | 4/2014 | |
| EM | 002479352-0001 | 6/2014 | |
| EM | 002479352-0002 | 6/2014 | |
| EM | 002479352-0003 | 6/2014 | |
| EM | 002479360-0001 | 6/2014 | |
| EM | 002479360-0002 | 6/2014 | |
| EM | 002479360-0003 | 6/2014 | |
| EM | 002479428-0001 | 6/2014 | |
| EM | 002479428-0002 | 6/2014 | |
| EM | 002479428-0003 | 6/2014 | |
| EM | 003462183-0001 | 11/2014 | |
| EM | 003462183-0002 | 11/2014 | |
| EM | 003462183-0003 | 11/2014 | |
| EM | 003462183-0004 | 11/2014 | |
| EM | 003462183-0005 | 11/2014 | |
| EM | 003462183-0006 | 11/2014 | |
| EM | 004415164-0001 | 10/2017 | |
| EM | 004415164-0002 | 10/2017 | |
| EM | 004415164-0003 | 10/2017 | |
| EM | 004415164-0004 | 10/2017 | |
| EM | 004415164-0005 | 10/2017 | |
| EM | 004415164-0006 | 10/2017 | |
| EM | 006836128-0001 | 6/2019 | |
| EM | 006836128-0002 | 6/2019 | |
| EM | 006836128-0003 | 6/2019 | |
| EM | 006836128-0004 | 6/2019 | |
| EM | 006836128-0005 | 6/2019 | |
| EM | 006836128-0006 | 6/2019 | |
| EM | 006836128-0007 | 6/2019 | |
| EM | 006836128-0008 | 6/2019 | |
| EM | 006836128-0009 | 6/2019 | |
| EM | 015045041-0001 | 12/2023 | |
| EM | 015045041-0002 | 12/2023 | |
| EP | 0265328 | 4/1988 | ............ H02J 7/34 |
| EP | 0329129 | 8/1989 | ............ G07F 17/24 |
| EP | 0933288 | 8/1999 | ............ B62H 3/00 |
| EP | 980055 | 2/2000 | ............ G07F 17/24 |
| EP | 1227448 | 7/2002 | ............ G07D 11/01 |
| EP | 1327962 | 7/2003 | ............ G07B 15/02 |
| EP | 1376491 | 1/2004 | ............ G07F 7/00 |
| EP | 1748393 | 1/2007 | ............ G07C 1/30 |
| EP | 1128350 | 10/2007 | ............ G07B 15/02 |
| EP | 1898360 | 3/2008 | ............ G07B 15/02 |
| EP | 2215605 | 8/2012 | ............ G07B 15/02 |
| FR | 2600448 | 6/1986 | ............ G07C 1/30 |
| FR | 2837583 | 9/2003 | ............ G06K 19/077 |
| FR | 2979726 | 3/2008 | ............ G06F 21/86 |
| FR | 2928678 | 9/2009 | ............ E05B 17/00 |
| GB | 1 237 579 | 12/1968 | |
| GB | 1 283 555 | 10/1969 | |
| GB | 1431862 | 4/1976 | ............ G08B 25/00 |
| GB | 2077475 | 12/1981 | ............ G07F 17/24 |
| GB | 2155228 | 9/1985 | ............ G09F 23/00 |
| GB | 2284919 | 6/1995 | ............ G07C 1/30 |
| GB | 2298510 | 9/1996 | ............ G07F 7/10 |
| GB | 2461397 | 1/2010 | ............ G07B 15/02 |
| GB | 6334881 | 12/2023 | |
| GB | 6337335 | 1/2024 | |
| IL | 149880 | 6/2007 | ............ G07B 15/00 |
| JP | S58121494 | 7/1983 | ............ G07C 1/30 |
| JP | S6437661 | 2/1989 | ............ E04H 6/00 |

(56) References Cited

FOREIGN PATENT DOCUMENTS

| | | | |
|---|---|---|---|
| JP | 01165494 | 6/1989 | ............ B42D 15/10 |
| JP | 01303026 | 12/1989 | ............... G11C 5/00 |
| JP | H028692 | 1/1990 | ............... F28F 1/32 |
| JP | 0261711 | 3/1990 | ............... G06F 1/26 |
| JP | H02180623 | 7/1990 | ............ B01D 63/02 |
| JP | 0487533 | 3/1992 | ............... H02J 9/00 |
| JP | H08305998 | 11/1996 | ............... E04H 6/00 |
| JP | S5259000 | 5/1997 | ............... G07C 1/30 |
| JP | 2000-286936 | 10/2000 | |
| JP | 2002-42181 | 2/2002 | ............... G07B 1/00 |
| JP | 2002074430 | 3/2002 | ............ G06Q 50/00 |
| JP | 2002099640 | 4/2002 | ............ G06Q 10/00 |
| JP | 2002528799 | 9/2002 | ............ G06Q 50/00 |
| JP | 3441832 | 6/2003 | ............... G07B 5/00 |
| JP | 2003169133 | 6/2003 | ............... H04M 1/73 |
| JP | 2003527701 | 9/2003 | ............ G06Q 40/00 |
| JP | 2005242888 | 9/2005 | ............ G06Q 10/00 |
| JP | 2005267430 | 9/2005 | ............ G06Q 10/00 |
| JP | 2007052773 | 3/2007 | ............ G07F 17/24 |
| JP | 4240927 | 1/2009 | ............... H04M 1/73 |
| JP | 4247079 | 1/2009 | ............... G07B 5/00 |
| JP | 2011060206 | 3/2011 | ............ G07B 15/00 |
| JP | 5238316 | 4/2013 | ............ G07B 15/00 |
| KR | 20000016671 | 3/2000 | ............ G07F 17/24 |
| KR | 20010028481 | 4/2001 | ............... G07B 1/00 |
| KR | 20050038077 | 4/2005 | ............... G07B 5/12 |
| KR | 1020060088085 | 8/2006 | ............ G08G 1/017 |
| KR | 100693204 | 3/2007 | ............... H01Q 7/00 |
| KR | 1020080026282 | 3/2008 | ............ G06F 19/00 |
| KR | 20080041730 | 5/2008 | ............ G06T 7/20 |
| MU | 76023990 | 1/1998 | ............... G06F 3/05 |
| MX | 2008007047 | 8/2008 | ............ G06Q 10/00 |
| NZ | 530606 | 11/2006 | ............... G07C 1/30 |
| WO | WO 81/00778 | 3/1981 | |
| WO | WO9520204 | 7/1995 | ............ G07F 17/24 |
| WO | WO9611453 | 4/1996 | ............... G07C 1/30 |
| WO | WO97/12345 | 4/1997 | ............ G07F 17/24 |
| WO | WO97/33341 | 9/1997 | ............... H01Q 9/27 |
| WO | WO9737328 | 10/1997 | ............ G07B 15/02 |
| WO | WO98/04080 | 1/1998 | |
| WO | WO0059201 | 10/2000 | ............ H04M 15/00 |
| WO | WO0124127 | 4/2001 | ............ G07F 17/24 |
| WO | WO01/69541 | 9/2001 | ............ G07F 17/24 |
| WO | WO0180157 | 10/2001 | ............ G06F 19/00 |
| WO | WO02063570 | 8/2002 | |
| WO | WO02084600 | 10/2002 | ............ G07B 15/02 |
| WO | WO03005324 | 1/2003 | ............... G08G 1/14 |
| WO | WO03009238 | 1/2003 | ............... G07C 1/30 |
| WO | WO03065322 | 8/2003 | ............ G07F 17/24 |
| WO | WO2004012352 | 2/2004 | ............... H04B 1/38 |
| WO | WO2005027035 | 3/2005 | ............ G06K 19/07 |
| WO | WO2005031494 | 4/2005 | |
| WO | WO2006076773 | 7/2006 | ............... G08G 1/14 |
| WO | WO2006095352 | 9/2006 | ............... H02J 9/06 |
| WO | WO2007063530 | 6/2007 | ............ G06Q 10/00 |
| WO | WO2009009854 | 1/2009 | ............ G06Q 50/00 |
| WO | WO2009154787 | 12/2009 | ............... G08G 1/14 |
| WO | WO2010008610 | 1/2010 | ............ G08G 1/065 |
| WO | WO2010062105 | 6/2010 | ............ G07F 19/00 |
| WO | WO2010071972 | 7/2010 | ............... G07C 1/30 |
| WO | WO2010071974 | 7/2010 | ............... G07C 1/30 |
| WO | WO2011029061 | 3/2011 | ............ G06Q 30/00 |
| WO | WO2011029062 | 3/2011 | ............ G06Q 20/00 |
| WO | WO2012015453 | 2/2012 | ............ G08G 1/042 |
| WO | WO2012092609 | 7/2012 | ............... G08G 1/01 |
| WO | WO2012154902 | 11/2012 | ............ G07F 17/14 |
| WO | WO2012154913 | 11/2012 | ............ G06Q 50/30 |
| WO | WO2013016453 | 1/2013 | ............ G07B 15/02 |
| WO | WO2013019273 | 2/2013 | ............... G06F 7/00 |
| WO | WO2013049418 | 4/2013 | |
| WO | WO2014014494 | 1/2014 | ............ G07B 15/02 |
| WO | WO2014127384 | 8/2014 | ............ G07F 19/00 |
| WO | WO2014152369 | 9/2014 | ............ G07B 15/02 |
| WO | WO2017024396 | 2/2017 | ............... G07C 1/30 |
| WO | WO2017024397 | 2/2017 | ............... G07C 1/30 |

OTHER PUBLICATIONS

US 9,640,016 B2, 05/2017, King et al. (withdrawn)
Ebay Listing, Amano Mcgann MSM Metric Elite LS Solar Electric Parking Lot Credit Pay Station, description, dated 2022.
Garra et al., A Privacy-Preserving Pay-by-Phone Parking System, IEEE, 2016, 11 pages.
IPS Group, Vehicle Detection Sensors, Smart Sensors, Unparalleled Audit Management, https://ipsgroupinc.com/vehicle-detection-sensors/, May 4, 2023, 12 pages.
Klinghardt Institute, The Heart of Healing, The Klinghardt "Brain Solutions" Protocol, 2 pages, dated Sep. 2023.
Nebraska Innovation Campus, Additional Way to Pay Metered Street Parking at NIC, dated Apr. 4, 2023, 2 pages.
Dalal, Pay Phones, Parking Meters, Vending Machines, and Optimal Bayesian Decisions on Collection Times, Journal of the American Statistical Association, Feb. 2001, 28 pages.
Cell Net Data Systems) "First Wireless Monitoring of Parking Meters Results in Theft Arrests Using CellNet Data Systems Technology," PRNewswire, May 11, 1999 (2 pgs).
Ambravan, B., "Improved-Clarity Polycarbonate (PC) Resins used in liniLED PU," http://organiclighting.com/tag/polycarbonate-pc-resins/, Sep. 26, 2016 (1 pg).
Anonymous, "The Originators of Metered Parking, Series II, APM-E Mechanism, Service Manual," POM Incorporated, May 23, 2006 revision (22 pgs).
Barefoot, D., "There'll be lies, there'll be tears, a jury of your peers," DarrenBarefoot.com: Dec. 2005, pp. 8-9 (39 pages).
Basu et al., "Networked Parking Spaces: Architecture and Applications," MCL Technical Report No. 07-01-2002, Proc. IEEE Vehicular Transportation Conference, Vancouver, Canada, Sep. 2002 (10 pgs).
Bayless et al., "Smart Parking and the Connected Consumer," ITS America Research, Dec. 2012 (39 pgs).
Bernspång, F., "Smart Parking using Magnetometers and Mobile Applications," Master's Thesis, Master of Science in Engineering Technology, Computer Science and Engineering, Lulea University of Technology, Nov. 2010-May 2011 (35 pgs).
Bridge IR Group, Inc., Changing the Way the World Pays for On-Street Parking, Research Report, United States—Technology Processing Systems/Products, Dec. 6, 2006 (23 pgs).
Burden et al., "Near Field Communications (NFC) in Public Transport," Digital Identity Forum, 2006 (18 pgs).
Byrd, Dennis, "City officials plug solar-powered parking meters, Electronic eye ends free parking," Lawrence Journal World, Apr. 30, 1989, p. 11C (1pg).
Byrd, Dennis, Parking Meter Manufacturer Sees Bright Future for New Sun-Powered Devices, Los Angeles Times, May 14, 1989 (2 pgs).
Cardinal Tracking Inc.—MobileCite brochure, dated prior to Jun. 15, 2015 (2 pgs).
Cosgrove, D., "SmartPark," Senior Project Report, Jun. 12, 2013 (20 pgs).
CWT MAX Single/Dual Space Meter, Technical Data, May 18, 2016 (4 pgs).
DAT Self-Service System Limited, Product Brochure, Version 1.0, Date: May 2005, pp. 1-39 (39 pgs), plus English translation (42 pgs).
Digital Payment Technologies—LUKE brochure, dated prior to Jun. 15, 2015 (4 pgs).
Digital Payment Technologies—LUKE website, https://web.archive.org/web/200061025094839/http:www.digitalpaytech.com/luke.html, Oct. 25, 2006 (5 pgs).
Digital Payment Technologies, Credit Card Processing with LUKE and SHELBY, Dec. 2007 (15 pgs).
Digital Payment Technologies, Digital Payment Technologies and PXT Payments Forge Partnership to Bring Cities Smart Parking Meters and Merchant Loyalty Debit Cards, www.digitalpaytech.com, Apr. 27, 2010 (2 pgs).
Digital Payment Technologies, Request for Proposal #B09030—Parking Pay Stations, City of Dover, New Hampshire, Oct. 22, 2008 (part 1-110 pgs).

(56) References Cited

OTHER PUBLICATIONS

Digital Payment Technologies, Request for Proposal #B09030—Parking Pay Stations, City of Dover, New Hampshire, Oct. 22, 2008 (part 2—160 pgs).
Parking Pay Stations, City of Cocoa Beach, Florida, accessed May 27, 2022, web archive 2 pgs.
Digital Payment Technologies, Request for Proposal for Multi-Space Parking Meters, City of Fort Lauderdale, Jan. 13, 2010 (89 pgs).
Digital Payment Technologies, Sierra Wireless Case Study, Dec. 7, 2009(2 pgs).
Digital Payment Technologies, Technologies Launches LUKE II Multi-Space Parking Pay Station, May 16, 2011 (3 pgs).
*Duncan Parking Technologies, Inc.* v. *IPS Group Inc.*, Case IPR2016-00068, Decision, Mar. 30, 2016 (13 pgs).
*Duncan Parking Technologies, Inc.* v. *IPS Group Inc.*, Case IPR2016-00070, Decision, Apr. 1, 2016 (17 pgs).
*Duncan Parking Technologies, Inc.* v. *IPS Group Inc.*, Case IPR2016-00069, Decision, Apr. 1, 2016 (13 pgs).
*Duncan Parking Technologies, Inc.* v. *IPS Group Inc.*, Case IPR2016-00067, Decision, Mar. 30, 2016 (19 pgs).
*Duncan Parking Technologies, Inc.* v. *IPS Group Inc.*, Case IPR2016-00067, Preliminary Response, Jan. 29, 2016 (38 pgs).
*Duncan Parking Technologies, Inc.* v. *IPS Group Inc.*, Case IPR2016-00068, Patent Owner's Preliminary Response, Feb. 1, 2016 (48 pgs).
*Duncan Parking Technologies, Inc.* v. *IPS Group Inc.*, Case IPR2016-00069, Patent Owner's Preliminary Response, Feb. 1, 2016 (48 pgs).
*Duncan Parking Technologies, Inc.* v. *IPS Group Inc.*, Case IPR2016-00070, Preliminary Response, Feb. 1, 2016 (49 pgs).
*Duncan Parking Technologies, Inc.* v. *IPS Group Inc.*, Case IPR2016-00067, Patent Owner's Mandatory Notices, Nov. 6, 2015 (4 pgs).
*Duncan Parking Technologies, Inc.* v. *IPS Group Inc.*, Case IPR2016-00067, Scheduling Order, Mar. 30, 2016 (9 pgs).
*Duncan Parking Technologies, Inc.* v. *IPS Group Inc.*, Case IRP2016-00067, Final Written Decision, Mar. 27, 2017 (19 pgs).
*Duncan Parking Technologies, Inc.* v. *IPS Group Inc.*, Petition for Inter Partes Review of U.S. Pat. No. 7,854,310, IPR2016-00067, Oct. 22, 2015 (66 pgs).
*Duncan Parking Technologies, Inc.* v. *IPS Group Inc.*, Petition for Inter Partes Review of U.S. Pat. No. 7,854,310, IPR2016-00068, Oct. 22, 2015 (64 pgs).
*Duncan Parking Technologies, Inc.* v. *IPS Group Inc.*, Petition for Inter Partes Review of U.S. Pat. No. 8,595,054, IPR2016-00069, Oct. 22, 2015 (67 pgs).
*Duncan Parking Technologies, Inc.* v. *IPS Group Inc.*, Petition for Inter Partes Review of U.S. Pat. No. 8,595,054, IPR2016-00070, Oct. 22, 2015 (61 pgs).
*Duncan Parking Technologies, Inc.* vs. *IPS Group Inc.*, Patent Owner's Preliminary Response, Case IPR2016-01144, dated Sep. 8, 2016 (58 pgs).
*Duncan Parking Technologies, Inc.* vs. *IPS Group Inc.*, Patent Owner's Preliminary Response, Case IPR2016-01145, dated Sep. 8, 2016 (52 pgs).
*Duncan Parking Technologies, Inc.* vs. *IPS Group Inc.*, Patent Owner Response, Case IPR2016-00067, dated Jul. 12, 2016 (32 pgs).
*Duncan Parking Technologies, Inc.* vs. *IPS Group Inc.*, Petition for Inter Partes Review, U.S. Pat. No. 8,595,054, dated Jun. 3, 2016 (79 pgs).
*Duncan Parking Technologies, Inc.* vs. *IPS Group Inc.*, Petition for Inter Partes Review, U.S. Pat. No. 7,854,310, dated Jun. 3, 2016 (70 pgs).
Duncan Solutions—AutoCITE brochure, 2013 (2 pgs).
Duncan Solutions—Eagle 2100 brochure, 2013 (2 pgs).
Duncan Solutions—Eagle CK brochure, 2013 (2 pgs).
Duncan Solutions—Intermec CN50 webpage, Mar. 8, 2011 (2 pgs).
Duncan Solutions—Motorola MC75 webpage, Mar. 8, 2011 (2 pgs).
Duncan Solutions—VM Pay-by-Space Multi-Space Meter brochure, 2013 (2 pgs).
Duncan Solutions "Single-Space Meters" brochure (2 pgs); Rev. 04/06, 2006 Duncan Solutions, Inc.
Duncan Solutions, AutoCITE™M X3 Handheld Computer, 2013 (2 pgs).
Duncan Solutions, Duncan VS, 2006 (2 pgs).
Duncan Solutions, Pay-by-Space Parking Meters, Customer Support Manual, Jul. 2006 (part 1—113 pgs).
Duncan Solutions, Pay-by-Space Parking Meters, Customer Support Manual, Jul. 2006 (part 2—103 pgs).
Duncan Solutions/Reino, RSV3 Digital Parking Meter, Jul. 5, 2011 (2 pgs).
Duncan, Duncan VM-Solar Power meter photograph, pre-Mar. 2011 (1 pg).
Exhibit 1003—Declaration of Todd Magness in Support of Petition for Inter Partes Review of U.S. Pat. No. 7,854,310, dated Oct. 21, 2015 (70 pgs).
Exhibit 1004—Declaration of Anderson Moore in Support of Petition for Inter Partes Review of U.S. Pat. No. 8,595,054, dated Oct. 21, 2015 (19 pgs).
Exhibit 1005—U.S. Appl. No. 60/741,920, filed Dec. 2, 2005 (20 pgs).
Exhibit 1009—Tung, Y., "Design of an Advanced On-street Parking Meter," Thesis, Rochester Institute of Technology, 2001 (75 pgs).
Exhibit 1010—Christian, S.E., "Parking Meter Winding Up for Computer Age," Chicago Tribune, May 19, 1995 (6 pgs).
Exhibit 1011—Associated Press, "New parking meters based on computer," The San Diego Union, Feb. 1, 1987 (1 pg).
Exhibit 1012—Lunden, J., Good Morning America transcript, Nov. 6, 1986 (3 pgs).
Exhibit 1013—LUKE Parking Station ad (p. 28), Parking Today, vol. 10, No. 4, Apr. 2005 (64 pgs).
Exhibit 1014—Blass, E., "Changing times," Lansing State Journal, Feb. 19, 1987 (1 pg).
Exhibit 1015—Gabriele, M.C., "Electronic Parking Meters Rival Mechanical Units," American Metal Market/Metalworking News, Sep. 29, 1986 (1 pg).
Exhibit 1016—Sandler, L., "Lovely VISA, meter maid: Use credit card to park," Milwaukee Journal Sentinel, Jun. 13, 2005 (1 pg).
Exhibit 1017—Item for Finance Committee, "Capital Works Reserve Fund, Head 708—Capital Subventions and Major Systems and Equipment," FCR(2002-03)18, May 24, 2002 (15 pgs).
Exhibit 1018—Anonymous, "Happy %#@! Anniversary, First Parking Meter Installed Jul. 16, 1935," The Expired Meter News, Views, Information on Driving in Chicago, Jul. 16, 2009 (10 pgs).
Exhibit 1019—Anonymous, Parking Meter Patented 72 Years Ago Today, The Expired Meter News, Views, Information on Driving in Chicago, May 24, 2010 (6 pgs).
Exhibit 1020—U.S. Pat. No. 2,118,318 to Magee, May 24, 1938 (11 pgs).
Exhibit 1032—U.S. Pat. No. 5,570,771 to Jacobs, Nov. 5, 1996 (29 pgs).
Exhibit 1034—Anonymous, "Smart Cards and Parking," TC-06001, Smart Card Alliance Transportation Council White Paper, Jan. 2006 (52 pgs).
Exhibit 1037—Catalog Entry for Exhibit 1009, Tung, Y., "Design of an advanced on-street parking meter," Oct. 18, 2015 (2 pgs).
Exhibit 1038—POM Parking Meters website, Oct. 20, 2015 (4 pgs).
Fidelman, C., "Time's running out for parking meters at present locations: $270,000 cited as replacement cost. City employees who ticket motorists find electronic meters unsuitable," The Gazette, Final Edition, Montreal, Quebec, Canada, Nov. 12, 2002, p. A7 (2 pgs).
Flatley, J., "In San Francisco, hackers park for free," posted Jul. 31, 2009, www.engadget.com (1 pg).
GE Plastics, "Weatherable PC applications expand," http://www.plasticstoday.com/weatherable-pc-applications-expand/14554616432605, Sep. 26, 2016 (2 pgs).
Howland, S., "How M2M Maximizes Denver's Revenue," FieldTechnologiesOnline.com, Oct. 2011, pp. 9-12 (4 pgs).
Independent News, "Technology Breakthrough counters abuse of disabled parking", Car Parking Technologies, Dec. 7, 2011, 1 pg.

(56) References Cited

OTHER PUBLICATIONS

Information Disclosure Statement by Applicant filed for U.S. Appl. No. 12/355,734 on May 23, 2012 (22 pgs).
Information Disclosure Statement by Applicant filed for U.S. Appl. No. 12/355,740 on May 23, 2012 (25 pgs).
Information Disclosure Statement by Applicant filed for U.S. Appl. No. 12/875,959 on May 24, 2012 (22 pgs).
Information Disclosure Statement by Applicant filed for U.S. Appl. No. 12/875,975 on May 24, 2012 (22 pgs).
Information Disclosure Statement by Applicant filed Oct. 23, 2012 for U.S. Appl. No. 12/355,734 (4 pgs).
International Preliminary Report on Patentability issued in related application No. PCT/CA2012/000191, dated Sep. 12, 2013 (7 pgs).
International Preliminary Report on Patentability, issued for application No. PCT/US2010/047907, dated Mar. 15, 2012 (6 pgs).
International Preliminary Report on Patentability, issued for application No. PCT/US2010/047906, dated Mar. 6, 2012 (5 pgs).
International Preliminary Report on Patentability, issued for application No. PCT/IB2006/054574, dated Mar. 10, 2009 (5 pgs).
International Search Report & Written Opinion, PCT/CA12/000191, dated Jun. 20, 2012 (8 pgs).
International Search Report and Written Opinion issued in application No. PCT/CA2016/050928, dated Oct. 12, 2016 (12 pgs).
International Search Report and Written Opinion issued in application No. PCT/CA2016/050927, dated Nov. 25, 2016 (14 pgs).
International Search Report issued for PCT/US2012/048190, dated Jan. 22, 2013 (4 pgs).
International Search Report issued in application No. PCT/US2012/037229, dated Jan. 28, 2013 (6 pgs).
International Search Report issued in application No. PCT/US2012/037205, dated Oct. 4, 2012 (3 pgs).
International Search Report issued in application No. PCT/US2013/021201, dated Apr. 30, 2013 (3 pgs).
International Search Report issued in related application No. PCT/CA2007/001266, dated Apr. 21, 2008 (3 pgs).
International Search Report, PCT/CA2009/001058, dated Nov. 12, 2009 (4 pgs).
International Search Report, PCT/CA2009/001657, dated Feb. 17, 2010 (2 pgs).
International Search Report, PCT/IB06/054574, dated Oct. 27, 2008 (2 pgs).
International Search Report, PCT/US2010/047906, dated Mar. 30, 2011 (3 pgs).
International Search Report, PCT/US2010/047907, dated Apr. 26, 2011 (3 pgs).
Intrinsync Software International, Inc., Intrinsyc and Digital Pioneer Partner on Development of New Leading Edge Parking Terminal Solution, Aug. 14, 2003 (2 pgs).
IPS Group Inc., Exhibit 2001, Design of an advanced on-street parking meter, Jan. 12, 2016 (2 pgs).
IPS Group Inc., Exhibit 2002, About RIT Digital Media Library, Jan. 12, 2016 (1 pg).
IPS Group Inc., Exhibit 2003, The U.S. Conference of Mayors Presents 'Best-Practice' Awards, Jan. 20, 2012 (2 pgs).
IPS Group Inc., Exhibit 2004, City of Los Angeles, Card & Coin Parking Meter Lease, Nov. 29, 2010 (4 pgs).
IPS Group Inc., Exhibit 2005, City of Culver City, California, Approval of a Contract with IPS Group Inc., for the Sole-Source Purchase of 1,000 Parking Meters, Dec. 12, 2011 (3 pgs).
IPS Group Inc., Exhibit 2006, City of San Luis Obispo City Manager Report, Award of Credit Card Meters and Service Contract, RFP Specification No. 91137, Jan. 20, 2012 (5 pgs).
IPS Group Inc., Exhibit 2007, Walnut Creek, Alternate Downtown Parking Pay Technology, Oct. 20, 2011 (4 pgs).
IPS Group Inc., Exhibit 2008, How M2M Maximizes Denver's Revenue, Oct. 2011 (4 pgs).
IPS Group Inc., Exhibit 2009, Somerville, MA, T&P Introduces User-Friendly Parking Meters & Service Upgrades with Electronic Meter Pilot, Apr. 19, 2011 (2 pgs).
IPS Multi Bay Parking Meter product description, http://www.design-industry.com.au/work/multi-bay-parking-meter/, Oct. 6, 2015 (6 pgs).
IPS Single Bay Parking Meter product description, http://www.design-industry.com.au/work/ips-single-parking-meter/, Oct. 6, 2015 (6 pgs).
Kienzle, meter photograph, pre-Mar. 2011 (1 pg).
MacKay Custodian™M Multi-Space Machine Configuration Guide, 2003-2005 (184 pgs).
MAX Dual Space Meter advertisement, Jun. 25, 2015 (2 pgs).
Mccullagh, D., "Hackers: We can bypass San Francisco e-parking meters," Jul. 30, 2009, http://news.cnet.com (2 pgs).
Meter Solutions, Single-Space Meters brochure, downloaded from www.duncansolutions.com website, revised Apr. 2006 (2 pgs).
Micrel, Application Note 51 Frequency Hopping Techniques, Jun. 2006, Rev. 1.0 (8 pgs).
Photo Violation Technologies—Revolutionizing the Industry by Perfecting How People Park, https://web.archive.org/web/20060813094459/http://photoviolation.com/, Aug. 13, 2006 (65 pgs).
Photo Violation Technologies—Revolutionizing the Industry by Perfecting How People Park, https://web.archive.org/web/20060823100739/http://photoviolation.com/, Aug. 23, 2006 (65 pgs).
Photo Violation Technologies—Revolutionizing the Industry by Perfecting How People Park, https://web.archive.org/web/20080222104246/http://photoviolation.com/, Feb. 22, 2008 (47 pgs).
Photo Violation Technologies—Revolutionizing the Industry by Perfecting How People Park, https://web.archive.org/web/20060110041849/http://photoviolation.com/, Jan. 10, 2006 (57 pgs).
Photo Violation Technologies—Revolutionizing the Industry by Perfecting How People Park, https://web.archive.org/web/20060715195511/http://photoviolation.com/, Jul. 15, 2006 (49 pgs).
Photo Violation Technologies—Revolutionizing the Industry by Perfecting How People Park, https://web.archive.org/web/20070628195927/http://www.photoviolation.com/, Jun. 28, 2007 (50 pgs).
Photo Violation Technologies Corp.—Products, Oct. 2, 2015 (3 pgs).
Photo Violation Technologies Corp. Press Releases, Jul. 18, 2005-Jan. 17, 2006 (9 pgs).
Photo Violation Technologies Corp., https://web.archive.org/web/20131118213440/http://photoviolationmeter.com/, Nov. 18, 2013 (8 pgs).
Photo Violation Technologies Corp., https://web.archive.org/web/20040401225217/http://photoviolationmeter.com/, Apr. 1, 2004 (50 pgs).
PhotoViolationMeter pamphlet, dated Jan. 18, 2006 (2 pgs).
POM APM photographs, dated Apr. 29, 2010 (33 pgs).
POM APM Solar Powered Meter advertisements, dated Apr. 28, 2010 (5 pgs).
Reino International, Recommended Cashbox Handling Guidelines, Version 2.0, Nov. 26, 2003 (7 pgs).
Reino Meter Advertisement, The power of a paystation, Parking Today, Aug. 2003 (1 pg).
Reino Parking Systems: On-Street Service Procedures, Jun. 29, 2004 (19 pgs).
Reino, Operator User Manual, 2003 (106 pgs).
Reino, Parking Systems RSV2 Service Manual, Version 3.1, Dec. 2003 (78 pgs).
Reino, RSV3 brochure, Nov. 10, 2007 (4 pgs).
Remedios et al., "NFC Technologies in Mobile Phones and Emerging Applications," 2006, IFIP International Federation for Information Processing, vol. 220, Information Technology for Balanced Manufacturing Systems, ed. Shen, W., (Boston: Springer, pp. 425-434 (10 pgs).
Request for Continued Examination (RCE) and Information Disclosure Statement by Applicant filed for U.S. Appl. No. 12/973,109 on May 31, 2012 (43 pgs).
Request for Continued Examination, dated Mar. 30, 2012 in U.S. Appl. No. 12/355,734 (32 pgs).
Request for Continued Examination, dated Sep. 27, 2011 in U.S. Appl. No. 12/059,909 (18 pgs).
Sedadi, Amir, City of Los Angels Inter-Department Correspondence, Card & Coin Meter Lease, Nov. 29, 2010 (4 pages).

(56) References Cited

OTHER PUBLICATIONS

Shaheen, S., "Smart Parking Management Field Test: A Bay Area Rapid Transit (BART) District Parking Demonstration," Institute of Transportation Studies, UC Davis, Jan. 1, 2005 (139 pgs).
Spp Reporter, No change for car park charge? Just RingGo, accessed May 27, 2022, https://www.northern-times.co.uk/news/no-change-for-car-park-charge-just-ringgo-140901/, 7 pgs.
Spyker, R.L., "Predicting capacitor run time for a battery/capacitor hybrid source," Power Electronic Drives and Energy Systems for Industrial Growth, 1998, abstract only (2 pgs).
StreetSmart Technology, LLC, "Technical Specifications and System Features for the StreetSmart Solution" Brochure, May 2011 (8 pgs).
Supplementary European Search Report issued in related application No. EP07784953, dated Jul. 1, 2010 (1 pg).
The Patented Photo ViolationMeter Solution book view, dated Mar. 28, 2006 (12 pgs).
The Photo ViolationMeter Case Study, Photo Violation Technologies Corp., Dec. 15, 2015 (4 pgs).
The United States Conference of Mayors Press Release, "The U.S. Conference of Mayors Presents 'Best-Practice' Awards," Jan. 20, 2012, (3 pgs).
Transcript & Screenshots of https://web.archive.org/web/20080222104246/http://www.photoviolation.com/videos/PCM.wmv, Photo Violation Technologies Corp.—"ParkCardMeter™ System," dated prior to Jun. 15, 2015 (6 pgs).
Transcript & Screenshots of https://web.archive.org/web/20080222104246/http://www.photoviolation.com/videos/HHU.wmv, Photo Violation Technologies Corp.—"Photo ViolationHandHeldUnit™," dated prior to Jun. 15, 2015 (7 pgs).
Transcript & Screenshots of https://web.archive.org/web/20080222104246/http://www.photoviolation.com/videos/PBS.wmv, Photo Violation Technologies Corp.—"The PBS Solution," dated prior to Jun. 15, 2015 (10 pgs).
Transcript & Screenshots of https://web.archive.org/web/20080222104246/http://www.photoviolation.com/videos/PVM.wmv, Photo Violation Technologies Corp.—"The PVM Solution," dated prior to Jun. 15, 2015 (17 pgs).
Design U.S. Appl. No. 29/466,268, filed Sep. 5, 2013 (19 pgs).
Design U.S. Appl. No. 29/466,267, filed Sep. 5, 2013 (19 pgs).
Design U.S. Appl. No. 29/466,269, filed Sep. 5, 2013 (19 pgs).
Design U.S. Appl. No. 29/477,176, filed Dec. 19, 2013 (24 pgs).
Design U.S. Appl. No. 29/477,195, filed Dec. 19, 2013 (21 pgs).
Design U.S. Appl. No. 29/477,196, filed Dec. 19, 2013 (21 pgs).
Design U.S. Appl. No. 29/477,339, filed Dec. 20, 2013 (21 pgs).
Design U.S. Appl. No. 29/477,402, filed Dec. 20, 2013 (24 pgs).
Design U.S. Appl. No. 29/477,405, filed Dec. 20, 2013 (24 pgs).
U.S. Appl. No. 15/474,773, filed Mar. 30, 2017 (68 pgs).
Video link, "ParkCardMeter™ System," https://web.archive.org/web/20080222104246/http://www.photoviolation.com/videos/PCM.wmv, Photo Violation Technologies Corp., dated prior to Jun. 15, 2015.
Video link, "Photo ViolationHandHeldUnit™," https://web.archive.org/web/20080222104246/http://www.photoviolation.com/videos/HHU.wmv, Photo Violation Technologies Corp., dated prior to Jun. 15, 2015.
Video link, "The PBS Solution," https://web.archive.org/web/20080222104246/http://www.photoviolation.com/videos/PBS.wmv, Photo Violation Technologies Corp., dated prior to Jun. 15, 2015.
Video link, "The PVM Solution," https://web.archive.org/web/20080222104246/http://www.photoviolation.com/videos/PVM.wmv, Photo Violation Technologies Corp., dated prior to Jun. 15, 2015.
Written Opinion issued in application No. PCT/US2012/037205, dated Oct. 4, 2012 (5 pgs).
Written Opinion issued in application No. PCT/US2012/037229, dated Jan. 28, 2013 (6 pgs).
YouTube video, "The Photo ViolationMeter TM" https://www.youtube.com/watch?v=YEFuebnwn_Y, Dec. 15, 2006 (2 pgs).
U.S. Appl. No. 08/959,109, filed Oct. 23, 1997.
U.S. Appl. No. 10/317,414, filed Dec. 12, 2002.
U.S. Appl. No. 12/430,733, filed Apr. 27, 2009.
U.S. Appl. No. 12/788,100, filed May 26, 2010.
U.S. Appl. No. 13/141,977, filed Jun. 23, 2011.
U.S. Appl. No. 13/141,983, filed Jun. 23, 2011.
U.S. Appl. No. 13/410,831, filed Mar. 2, 2012.
U.S. Appl. No. 13/454,976, filed Apr. 24, 2012.
U.S. Appl. No. 13/529,914, filed Jun. 21, 2012.
U.S. Appl. No. 13/545,871, filed Jul. 10, 2012.
U.S. Appl. No. 13/546,918, filed Jul. 11, 2012.
U.S. Appl. No. 29/367,429, filed Aug. 6, 2010.
U.S. Appl. No. 29/367,431, filed Aug. 6, 2010.
U.S. Appl. No. 29/391,605, filed May 11, 2011.
U.S. Appl. No. 29/410,857, filed Jan. 12, 2012.
U.S. Appl. No. 29/433,549, filed Oct. 1, 2012.
U.S. Appl. No. 61/048,133, filed Apr. 25, 2008.
U.S. Appl. No. 61/140,543, filed Dec. 23, 2008.
U.S. Appl. No. 13/782,818, filed Mar. 1, 2013.
U.S. Appl. No. 14/094,382, filed Dec. 2, 2013.
U.S. Appl. No. 29/489,572, filed Apr. 30, 2014.
U.S. Appl. No. 14/325,134, filed Jul. 7, 2014.
U.S. Appl. No. 14/743,691, filed Jun. 18, 2015.
U.S. Appl. No. 14/864,170, filed Sep. 24, 2015.
U.S. Appl. No. 15/220,228, filed Jul. 26, 2016.
U.S. Appl. No. 15/348,785, filed Nov. 10, 2016.
U.S. Appl. No. 15/783,716, filed Oct. 13, 2017.
U.S. Appl. No. 15/802,298, filed Nov. 2, 2017.
U.S. Appl. No. 16/165,844, filed Oct. 19, 2018.
U.S. Appl. No. 16/218,219, filed Dec. 12, 2018.
U.S. Appl. No. 16/548,513, filed Aug. 22, 2019.
U.S. Appl. No. 16/709,531, filed Dec. 10, 2019.
Alibaba.com, "Ticket dispenser parking management system auto payment station machine street parking meter coin parking meters" http://www.alibaba.com/product-detail/Ticket-dispenser-parking-management-system-auto_60612328565.html 12 pages, accessed Aug. 29, 2023.
IPS Group, "M5 Single-Space Meter", ipsgroup.com, 2 pages, 2022.
IPS Group, "Stereoscopic Sensors", ipsgroup.com, 2 pages, 2022.
Made-in-China.com, "Pay Station for Payment—Parking Meter with Solar, Parking Management Payment, Automatic Park Pay Station for Car Parking Management Payment" 3 pages, accessed Aug. 29, 2023.
PAR-KUT International, "Pay Station Shelters", https://www.parkut.com/products/shelters/pay-station-shelters/ 3 pages, accessed Aug. 29, 2023.
Tung, "Design of an advanced on-street parking meter", Thesis, 2001, 75 pages.
Christian, "Parking Meter Winding Up for Computer Age", Tribune Suburban Affairs, Chicago Tribune, May 19, 1995, 6 pages.
Associated Press, "New Parking Meters based on computer", The San Diego Union, Feb. 1, 1987, 1 page.
Lunden, Good Morning America, TV Clips, Nov. 6, 1986, Transcript, 3 pages.
Parking Today, vol. 10, No. 4, PT Goes Internet, Special Airports Issue, Apr. 2005, www.parkingtoday.com, 30 pages.
Parking Today, vol. 10, No. 4, PT Goes Internet, Special Airports Issue, Apr. 2005, www.parkingtoday.com, 34 pages.
Blass, Eileen, "Changing Times", Lansing State Journal, Feb. 19, 1987, 1 page.
Gabriele, "Electronic Models, Create Battle of Parking Meters", American Metal Market/Metalworking News, Sep. 29, 1986, 1 page.
Sadler, Larry "Lovely VISA, meter maid: Use credit card to park", Milwaukee Journal Sentinel, Jun. 13, 2005, 1 page.
Transport Department, "Capital Works Reserve Fund - Head 708-Captial Subventions and Major systems and Equipment", May 24, 2002, 15 pages.
The Expired Meter "Happy %#@! Anniversary, First Parking Meter Installed Jul. 16, 1935", Jul. 16, 2009, 10 pages.
The Expired Meter "HParking Meter Patented 72 Years Ago Today", May 24, 2010, 6 pages.

(56) References Cited

OTHER PUBLICATIONS

Smart Card Alliance, "Smart Cards and Parking: A Smart Card Alliance Transportation Council White Paper", Jan. 2006, 52 pages.
Tung, Yaotsung, "Design of an advanced on-street parking meter" (2001). Thesis. Rochester Institute of Technology. Accessed from http://scholarworks.rit.edu/theses/549, 2001, 2 pages.
Pom Parking Meters Website, http://www.pom.com, Oct. 20, 2015, 4 pages.
Tung, "Design of An Advanced on-street parking meter", RIT Digital Media Library Repository, http://hdl.handle.net/1850/14751, 2001, 2 pages.
Rochester Institute of Technology's Digital Library, About page, http://digitalarchive.rit.edu, 1 page.
Webb, "The U.S. Conference of Mayors Presents 'Best-Practice' Awards", The United States Conference of Mayers, Jan. 20, 2012, 2 pages.
Sedadi, Amir, "Card & Coin Parking Meter Lease", City of Los Angeles, Inter-Departmental Correspondence, Nov. 29, 2010, 4 pages.
Garcia, Gabe, City Council Agenda, Agenda Item Report, City of Culver City, California, Dec. 12, 2011, 3 pages.
Walter, Jay D., "Award of Credit Card Meters and Service Contract, RFP Specification No. 91137", City Manager Report, City of San Luis Obispo, Jan. 17, 2012, 5 pages.
Raie et al. "Transportation Commission Staff Report: Alternate Downtown Parking Pay Technology", City of Walnut Creek, Oct. 20, 2011, 4 pages.
Howland, Sarah "How M2M Maximizes Denver's Revenue", FieldTechnologiesOnline.coc, Oct. 2011, 4 pages.
City of Somerville, Ma, "T&P Introduces User-Friendly Parkign Meters & Service Upgrades with Electronic Meter Pilot", Apr. 19, 2011, 2 pages.
Coma, Manufacture Automated Car Parking & Access Control Equipments, Product +Solution, Advertising Autopay Station with Parking Flap Solutions Manufacturers and Suppliers China COMA Electronics, www.coma-carparking.com, Dec. 30, 2024, 7 pages.
IPS Group, Revolution Pay Station Upgrade Kits, www.ipsgroupinc.com, Dec. 30, 2024, 5 pages.
Dwivedi et al., "Prototype for Multiple Application using Near Field Communication (NFC) technology on Android Device", 2015 International Conference on Advances in Computing, Communications and Infomatrics (ICACCI), 6 pages.
Rfs-Ulster University, Wayback Machine, Picture, www.skidata.com, Dec. 30, 2024, 1 page.

\* cited by examiner

FIG. 1 - Prior Art

PARKING METER WITH CONTACTLESS PAYMENT

CROSS REFERENCE TO RELATED APPLICATIONS

This application is a continuation of U.S. patent application Ser. No. 17/079,385, filed Oct. 23, 2020, which is a continuation of U.S. patent application Ser. No. 16/548,513, filed Aug. 22, 2019, now U.S. Pat. No. 10,861,278, which is a continuation of U.S. patent application Ser. No. 15/783,716 filed Oct. 13, 2017, now U.S. Pat. No. 10,424,147, which is a continuation of U.S. patent application Ser. No. 14/864,170 filed Sep. 24, 2015, now U.S. Pat. No. 9,934,645, which is a continuation of U.S. patent application Ser. No. 13/546,918, filed Jul. 11, 2012, now U.S. Pat. No. 9,406,056, which claims benefit by way of PCT patent application no. PCT/CA12/000191, filed Mar. 2, 2012; U.S. patent application Ser. No. 13/410,831, filed Mar. 2, 2012, now U.S. Pat. No. 8,770,371; Canadian patent application no. 2,733,110, filed Mar. 3, 2011; and Canadian patent application no. 2,756,489, filed Oct. 28, 2011.

TECHNICAL FIELD

The present disclosure relates to parking meters and in particular to parking meters having contactless payment options.

BACKGROUND

Parking meters come in many shapes and sizes but are generally divided into two main types or classes: multi-space parking meters which are typically larger devices capable of managing the parking payment and control for typically six or more, or possibly even hundreds of parking spaces; and, single-space parking meters which are typically small devices capable of managing the parking payment and control of a single parking space, but also sometimes additional spaces, such as two, four, or six spaces which are located in close proximity to the parking meter.

For example, FIG. 1 depicts a conventional single space parking meter 100 installed on a pole 102. Single space parking meter mechanisms are typically installed in a protective housing on a pole 102 near a parking space. The protective housing components, which are directly exposed to the elements and the public, are traditionally separate from the actual parking meter mechanism (not shown). The protective housing components of previous single space parking meters 100 typically comprise a lower housing 104 that receives a removable parking meter mechanism. A cover cap 106 is placed over the parking meter mechanism and secured to the lower housing 104. The cover cap 106 may comprise a semi-circular opening no, covered by a transparent material through which a display of the parking meter mechanism is visible. In some previous single space parking meters the display is set back from the exterior surface of the cover cap 106, or the transparent material covering the opening. The lower housing 104 is typically secured to a coin vault 108 for storing coins received during operation of the parking meter too. The coin vault 108 may be secured to the pole 102. The parking meter too is operated by inserting payment, either in the form of coins or payment cards such as credit cards, chip cards or electronic purse cards, into the parking meter too which then displays and counts down the purchased amount of parking time.

Parking meters are often located in unattended areas, and as such vandalism, tampering and theft are of concern. The protective housing, which typically comprises the lower housing 104 and the cover cap 106, provides protection for the components of the parking meter mechanism from vandalism, tampering and theft, as well as protection from the environment.

Numerous credit card companies have now issued contactless payment cards which allow the card holder to make payment at devices with the appropriate contactless card readers. Previous parking meters have employed contactless card readers that allowed receiving payment from a card without the need of the card reader coming into contact with the payment card. However, previous parking meters have incorporated the contactless card reader as a separate component or with other payment means, such as the coin chute. Alternatively, the card reader could replace other payment means entirely. Although the incorporation of contactless card readers in parking meters may provide flexibility in the payment options available to a user of the parking meter, the position of the contactless card reader within the parking meter provided unsatisfactory user interactions. For example, when a contactless card reader is positioned away from a display of a parking meter, it has been difficult to provide clear instructions using the display indicating where to make payment with the contactless card reader. In addition, a parking meter having a contactless card reader positioned away from a display may require a separate or additional opening in the housing of the parking meter, which may lead to more costly, complex and time consuming manufacturing of the housing, and may make the parking meter more susceptible to vandalism, tampering or theft.

There is therefore a need for a parking meter having an improved implementation for contactless payments.

SUMMARY

There is disclosed a parking meter comprising components for providing parking meter functionality; a display for displaying parking meter information; a metal housing for protecting the parking meter components from an environment, the housing comprising a display aperture through which the display is visible; and an antenna for a contactless payment reader arranged in or on the parking meter in close proximity to the display.

There is further disclosed a removable parking meter mechanism comprising components for providing parking meter functionality; a display for displaying parking information; and an antenna for a contactless payment reader arranged in close proximity to the display.

BRIEF DESCRIPTION OF THE DRAWINGS

Further features and advantages will become apparent from the following detailed description, taken in combination with the appended drawings, in which.

DETAILED DESCRIPTION

Figure 1:
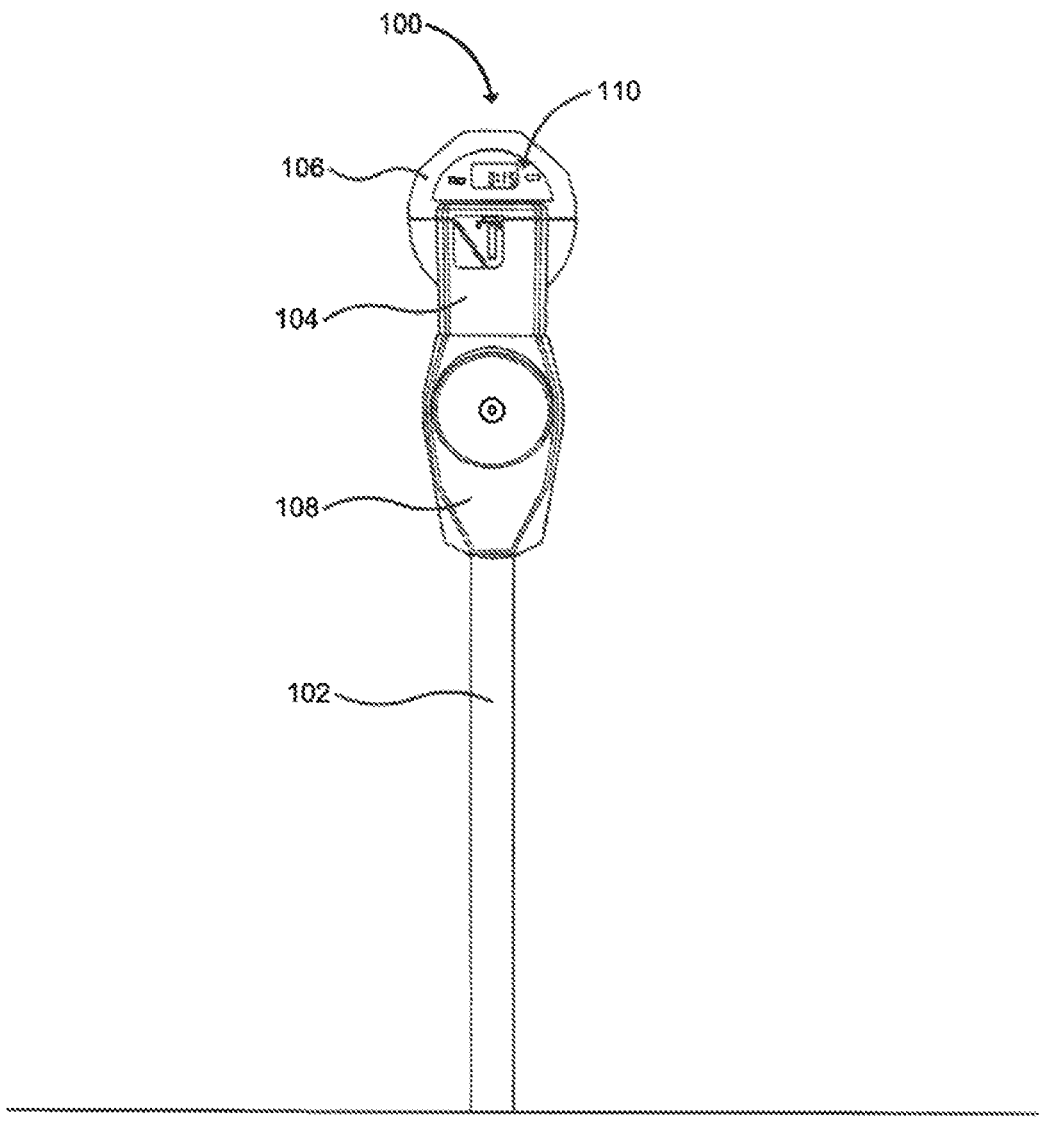
FIG. 1 is a schematic showing an installed previous single space parking meter.
Figure 2:
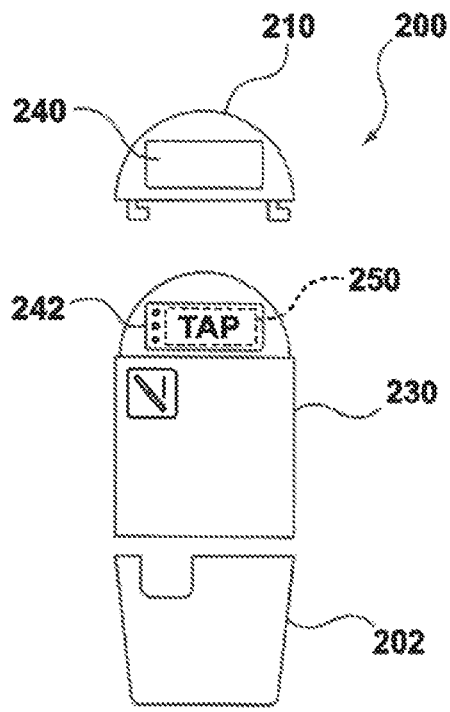
FIG. 2 depicts illustrative components of a single space parking meter including contactless payment means.

FIG. 2 depicts illustrative components of a single space parking meter. The single space parking meter 200 comprises a lower housing 202, a cover housing 210 and a removable parking meter mechanism 230. The parking meter mechanism 230 may be partially received within the lower housing 202, which is typically secured to a coin vault (not shown) that is mounted on a pole (not shown) when in use.

When the parking meter 200 is assembled, that is, the parking meter mechanism 230 is at least partially placed in the lower housing 202 and the cover housing 210 is secured and/or locked to the lower housing 202, the parking meter mechanism 230 is enclosed in a protective housing and protected from the environment, vandalism, tampering, theft or other unauthorized access. When assembled, the parking meter 200 includes a display opening 240 through which a display 242 of the parking meter mechanism 230 is visible. The parking meter mechanism 230 may include a contactless payment reader for providing payment using a contactless payment card issued by the parking operator or by a bank or financial institution under one of the credit card brands, or a card conforming to the ISO 14443 standard, although other types of near field communication (NFC) are possible such as an NFC enabled mobile phone, smartphone, wrist watch, or other appropriate tag, or token.

The contactless payment reader comprises a reader module (not visible) comprising electronics for controlling the operation of the contactless payment reader. The reader module is coupled to a contactless reader antenna 250. The contactless reader antenna 250 may be provided as a thin flexible ring of copper wiring around the perimeter of a viewing area of the display. The contactless reader antenna 250 is depicted by a dashed line in FIG. 2 as it is located behind the display 242. The contactless reader may be provided on a single board or component that includes both the contactless reader module and the contactless reader antenna 250. Alternatively, the contactless reader module may be separate from the contactless reader antenna 250 and connected to it by a wire or wires. The contactless reader module is in communication with electronics of the parking meter mechanism responsible for the overall operation of the parking meter. Alternatively, the contactless reader module may be incorporated into the electronics of the parking meter mechanism responsible for the overall operation of the parking meter.

When a contactless payment card, or other contactless payment device, is placed in close proximity to the contactless reader antenna 250, the contactless reader module can read information from the contactless payment card, which can be provided to the electronics of the parking meter mechanism in order to receive payment. In order to process the payment from the contactless payment card, the electronics of the parking meter mechanism may communicate with a remote server using wired or wireless communication technologies in order to receive authorization of the transaction.

Previous parking meters have included a contactless type payment method using a contactless payment reader. However, there were disadvantages associated with the placement of contactless payment readers, or more particularly the contactless reader antenna, within previous parking meters. For example, the difficulties included difficulty in providing adequate space to place a contactless payment reader as well as difficulty in providing instructions to a user, while still offering other payment means. Having the contactless reader antenna located away from the display, as in previous parking meters, makes it more difficult to provide instructions to a user for where to place the contactless payment card for payment.

The parking meter mechanism 230 includes a contactless payment reader that has a contactless reader antenna 250 located directly behind the display 242, which allows for payment by way of a contactless payment card or device (not shown). The display 242 is located in close enough proximity to the exterior of the parking meter 200 such that the contactless payment reader is able to adequately read contactless payment cards or devices placed over, or in close proximity to, the display 242, and so the contactless reader antenna 250. The maximum read distance between the contactless payment card or device and the contactless reader antenna is typically a function of the size of the contactless reader antenna 250, the presence of any material, and its nature if present, between, or in the vicinity of, the contactless reader antenna and the contactless payment card of device, and other operating conditions of the parking meter 200. The distance between the contactless reader antenna and the contactless payment card or device, as well as properties of any intervening material, may affect the probability of successfully reading the contactless payment card or device. Different applications may have different acceptable reading success rates and as such, may have varying acceptable distances between the contactless reader antenna and the contactless payment card or device. An adequate success rate for reading of contactless payment cards or devices by the contactless payment reader through the display 242 may be accomplished even with a double layer of a clear protective cover placed over the display 242. Since the contactless reader antenna 250 is placed behind the display 242, which is significantly more transparent to the wireless signals used by the contactless payment reader than housing components of the parking meter 200, which are typically made of metal, no additional openings or apertures need to be included in the housing components to provide adequate operation of the contactless payment reader. Thus, by placing the contactless payment reader behind the display 242, in addition to providing a convenient location for placing the contactless payment device to initiate payment, it is possible to provide housing components that provide greater security and environmental protection.

When making payment using the contactless payment reader, the display 242 may be used to display a logo, graphic and/or directions such as "Tap Here" or simply "Tap" as depicted, providing clear and convenient payment instructions to the user. The contactless reader antenna 250 is located sufficiently close to the display so that a user placing the contactless payment card or device in the vicinity of the display 242 as instructed by the display will have an acceptable success rate for reading the contactless payment card or device.

By placing the contactless reader antenna 250 behind the display 242, the amount of space required to offer this method of payment may be reduced, as the need of an additional opening or aperture in the housing components is eliminated. In addition, the display 242 and possible protective covering of the display 242 provide protection and ruggedness so as to allow the contactless payment reader to be deployed in unattended single space parking meters without the need for additional protection. Additionally, by placing the contactless reader antenna behind the display 242, the physical packaging of the parking meter mechanism 230 may be reduced to provide more freedom in the design of the parking meter 200, possibly allowing a smaller more appealing single space parking meter, which may be desirable given the large number of single space parking meters that may be present on a single street or block.

Placing the contactless reader antenna 250 behind the display 242 as described above may work acceptably well if the display 242 does not have a sufficient amount of metal to significantly impeded the RF signals. However, some displays, for example colour displays, may have a metal backing, impeding the transmission of RF signals.

Figure 3:
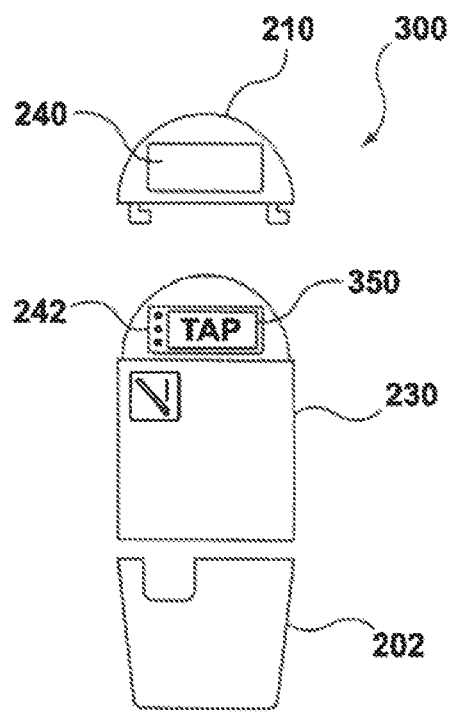
FIG. 3 depicts illustrative components of a further single space parking meter including contactless payment means.

FIG. 3 depicts illustrative components of a single space parking meter. The parking meter 300 is similar to the parking meter 200 described above; however, the contactless reader antenna 350 is placed on the front of the display 242. The contactless reader antenna 350 may be placed around the perimeter of an active section of the display that displays information in order to prevent obscuring the view of the display. The contactless reader antenna 350 on the front of the display 242 may be in sufficiently close proximity to the display 242 so that a contactless payment card or device placed in the vicinity of the display 242 as instructed will have an acceptable reading success rate.

The opening 240 in the parking meter housing, through which the display 242 is visible when the parking meter 300 is assembled, also allows the transmission and reception of the required RF signals at the contactless reader antenna 350 for the operation of the contactless payment. The opening 240 is sized so that the RF signals can pass through a non-metallic material used to seal the opening 240. As a result, the RF signals do not need to pass through the metallic housing, providing improved operation of the contactless payment reader.

Figure 4:
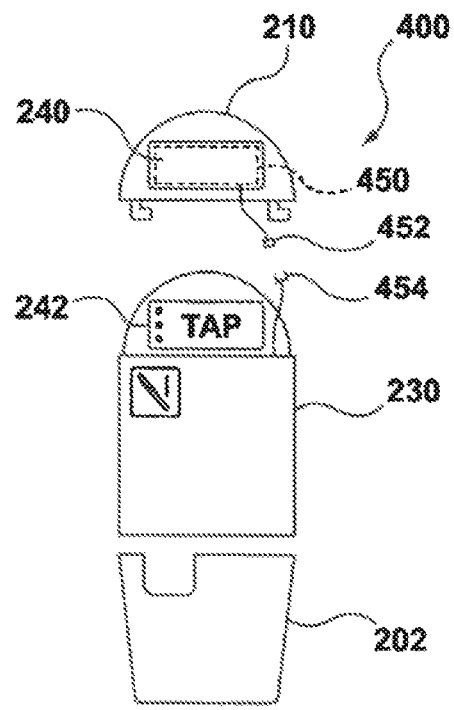
FIG. 4 depicts illustrative components of a further single space parking meter including contactless payment means.

FIG. 4 depicts illustrative components of a single space parking meter. The parking meter 400 is similar to the parking meters 200 and 300 described above; however, the contactless reader antenna 450 is placed on the interior of a material used to seal or cover the opening 240 in the parking meter housing through which the display 242 is visible. Typically, the external housing of the parking meter 400 is made of metal, which attenuates RF signals. The opening 240 is typically sealed using a transparent or semi-transparent material such as Lexan. The material used to enclose the opening 240 is typically transparent or semi-transparent to RF signals.

As depicted in FIG. 4, the contactless reader antenna 450, represented by a dashed line, is placed on the interior side of the material sealing the opening 240. The cover 210 may need to be separated from a lower portion 202 of the parking meter 400 in order to remove the parking meter mechanism 230. The contactless reader antenna 450 may be attached to the contactless reader module of the removable parking meter mechanism 230 by a detachable connection 452, 454. As such, when removing the cover 210, the contactless reader antenna 450 can be detached from the removable parking meter mechanism 230 and then reattached when assembling the parking meter 400.

Figure 5:
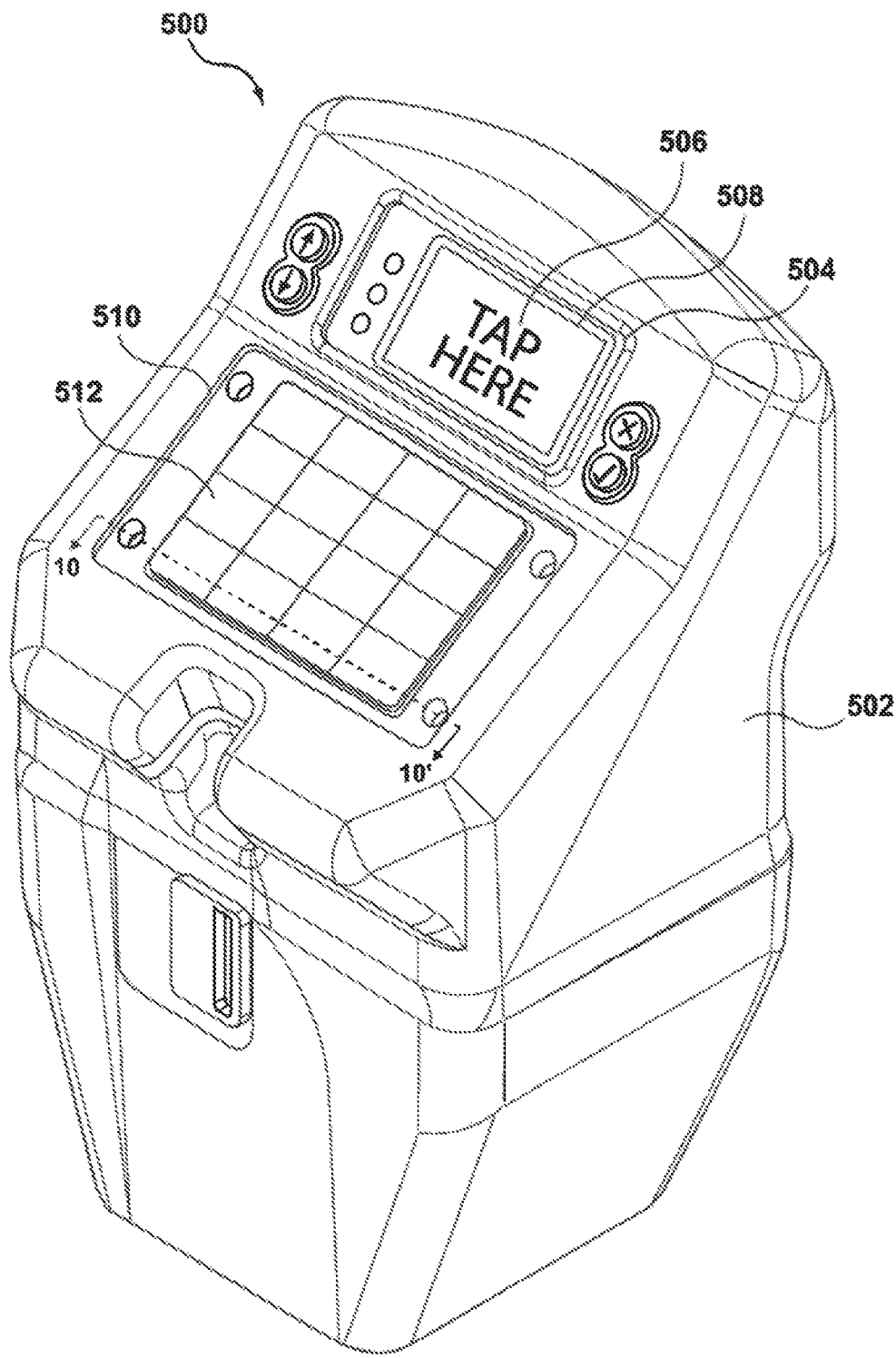
FIG. 5 depicts illustrative components of a further single space parking meter including contactless payment means.

FIG. 5 depicts illustrative components of a single space parking meter. The parking meter 500 comprises a meter housing 502 that encloses a parking meter mechanism and protects it from the environment and vandalism. The meter housing 502 is typically made out of a metal or metal alloy and comprises one or more apertures providing windows to internal components, including a solar panel opening 510 through which a solar panel 512 may be visible. As depicted, the meter housing 502 includes a display opening 504 through which a display 506 is visible when the parking meter 500 is assembled. The display opening 504 in the metal housing 502 is typically sealed with a transparent or semi-transparent protective material such as Lexan. The parking meter 500 may include a solar panel opening 510 in the housing 502 in which a solar panel 512 can sit, or through which a solar panel is visible.

The display 506 is located behind the display opening 504 so that it is viewable when the parking meter 500 is assembled. The display 506 includes a contactless reader antenna 508 surrounding a perimeter of the display 506. The reader antenna 508 is located within the display opening 504, providing a transmission path between the antenna 508 and the contactless payment device that is not impeded by the metal of the meter housing 502. Although described as being located around a perimeter of the display 506, it is contemplated that the contactless reader antenna 508 could be located in different locations in or on the parking meter and arranged in sufficiently close proximity to the display 506 so that a contactless payment device placed in the vicinity of the display 506 has an acceptable success rate for reading the contactless payment device.

Figure 6:
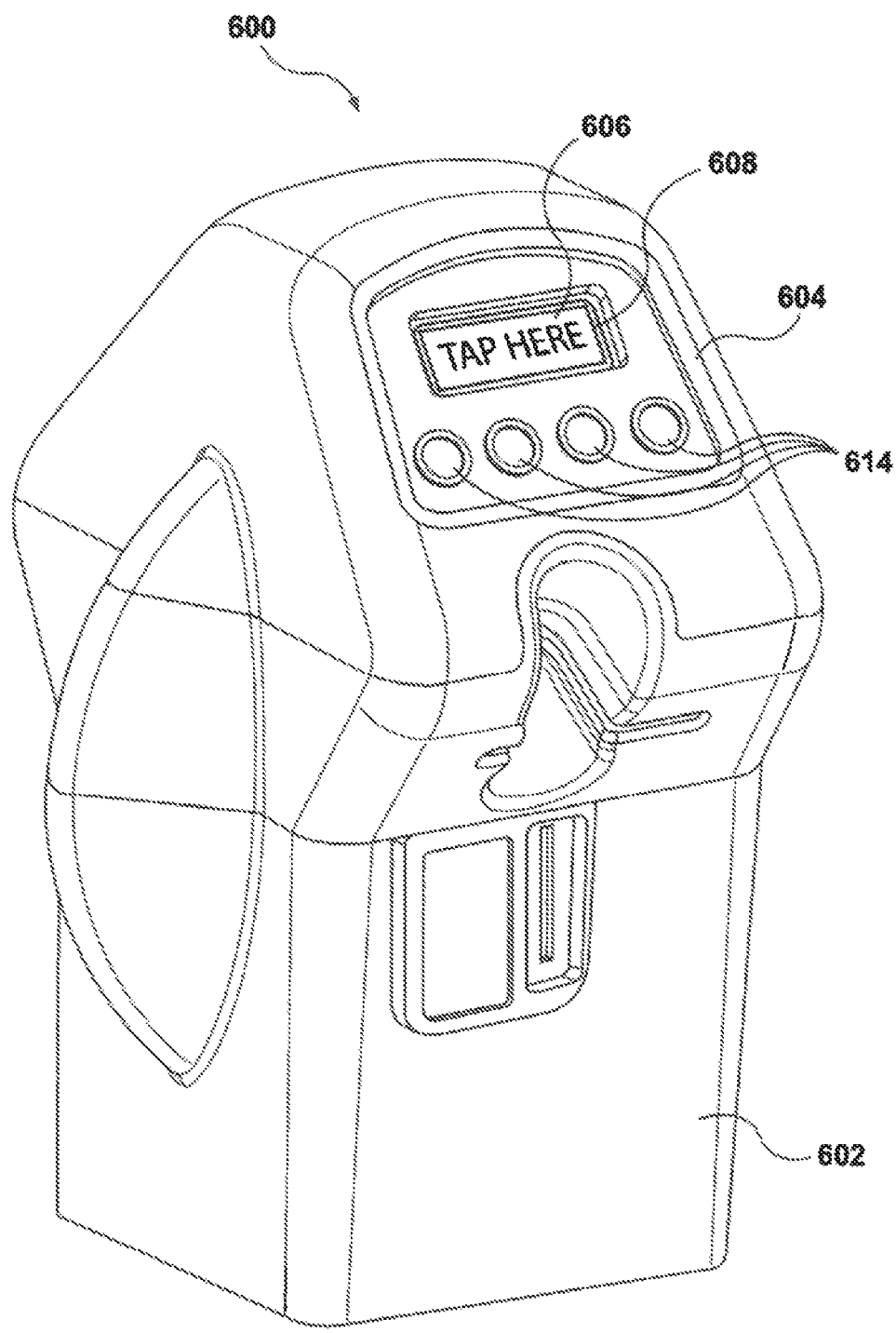
FIG. 6 depicts illustrative components of a further single space parking meter including contactless payment means.

FIG. 6 depicts illustrative components of a single space parking meter. The parking meter 600 comprises a meter housing 602 that encloses a parking meter mechanism and protects it from the environment and vandalism. The meter housing 602 is typically made out of a metal or metal alloy and comprises one or more apertures providing windows to internal components. As depicted, the meter housing 602 includes an opening 604 through which a display 606 is visible when the parking meter 600 is assembled. The opening 604 in the metal housing 602 is sized such that the display 606 is visible, and a section which incorporates a plurality of buttons 614 for controlling the parking meter 600 is exposed.

The display 606 is located behind the opening 604 so that it is viewable when the parking meter 600 is assembled. The display 606 includes a contactless reader antenna 608 surrounding a perimeter of the display 606. The reader antenna 608 is located within the opening 604 which is covered by a material providing a low attenuation of RF signals, providing a transmission path between the antenna 608 and the contactless payment device that is not impeded by the metal of the meter housing 602.

Although described as being located around a perimeter of the display 606, it is contemplated that the antenna 608 could be located in different locations in or on the parking meter 600 and arranged in sufficiently close proximity to the display 606 so that a contactless payment device placed in the vicinity of the display 606 has an acceptable success rate for reading a contactless payment device.

Figure 7:
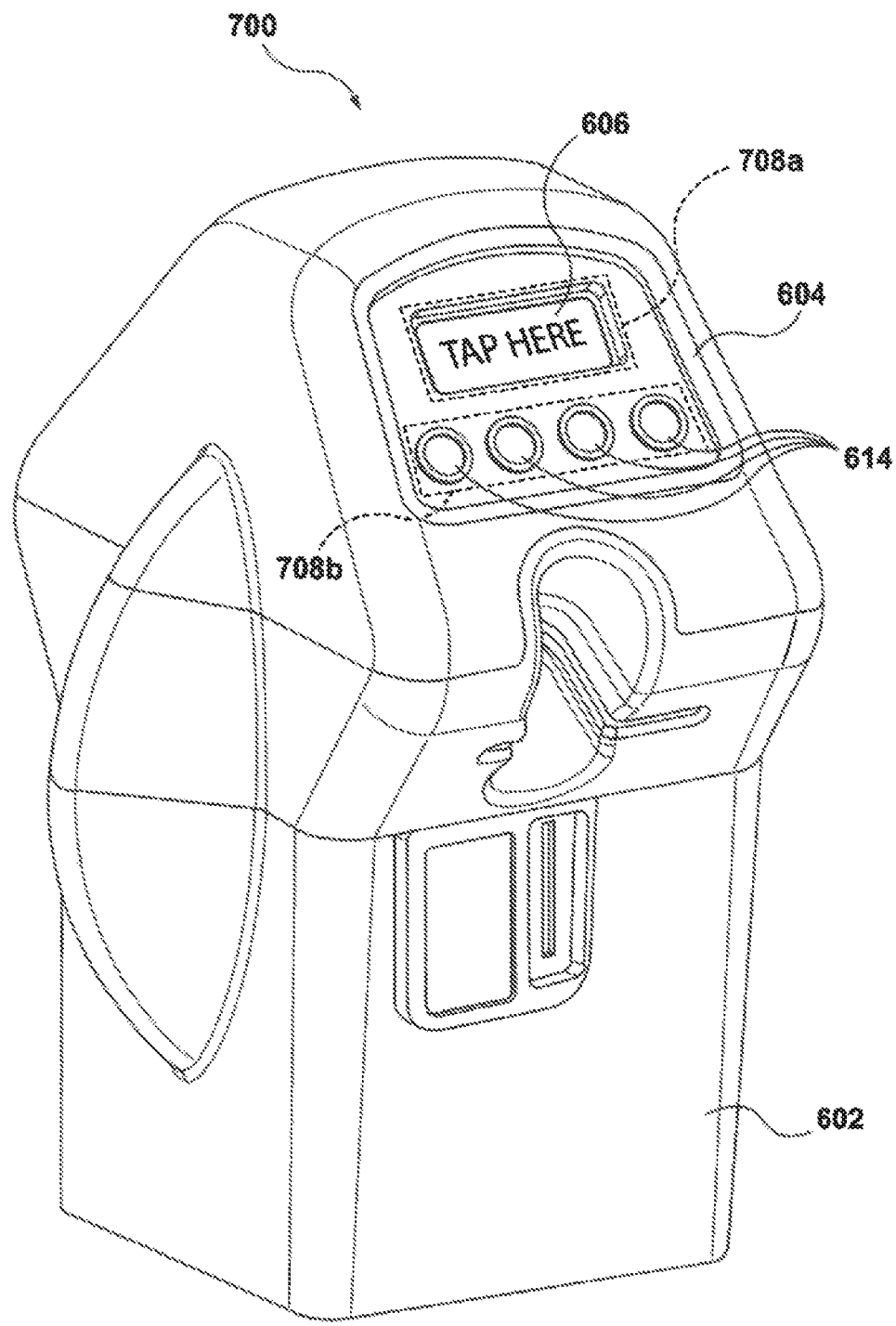
FIG. 7 depicts illustrative components of a further single space parking meter including contactless payment means.

FIG. 7 depicts illustrative components of a single space parking meter. The parking meter 700 is substantially similar to parking meter 600; however, the contactless reader antenna 708a is depicted as being located on an interior side of the material used to seal or cover the opening 604 and in close proximity to the display 606. Additionally or alternatively, a second contactless reader antenna 708b may be included on the interior side of the material used to seal or cover the opening 604 and surrounding the input components (i.e., buttons) 614 in close proximity to the display 606. With the contactless reader antenna 708a or 708b located on the interior side of the material used to seal or cover the opening 604, it may be connected to the electronics of the parking meter mechanism using a detachable connection.

Although described as being located around a perimeter of the display 606, it is contemplated that the antenna 708a could be located in different locations in or on the parking meter 700 and arranged in sufficiently close proximity to the display 606 so that a contactless payment device placed in the vicinity of the display 606 has an acceptable success rate for reading a contactless payment device. Likewise, although described as being located around the input components 614, it is contemplated that the antenna 708b could be located in different locations in or on the parking meter 700 and arranged in sufficiently close proximity to the display 606 so that a contactless payment device placed in the vicinity of the display 606 has an acceptable success rate for reading a contactless payment device.

Various possible positions of the antenna within the opening of the parking meter have been described above with reference to FIG. 7. Although the possible positions were described with regards to a single opening in the parking meter, a contactless reader antenna may also be positioned within or about a second opening separate from the opening for the display and still be in sufficiently close proximity to the display to facilitate clear payment instructions. For example, and with regards to FIG. 5, the contactless reader antenna could be placed in proximity to the solar panel opening 510, on the solar panel 512, on a cover of the solar panel opening 510, over the top surface of the solar panel 512, or a combination of one or more of the foregoing.

Alternatively, the contactless reader antenna could be placed on an exterior side of the parking meter, for example, over a protective cover of the display opening 504 or the solar panel opening 510. If the contactless reader antenna is placed on the exterior of the parking meter, it may be located at the same height, or slightly elevated relative to the metal housing surrounding the opening. The contactless reader antenna may be protected by a plastic bezel that encapsulates the contactless reader antenna and securely attaches to the parking meter.

Although the solar panel opening is described above as an opening, it may be provided by an indentation such that a solar panel and covering may rest flush with the rest of the housing. If the solar panel opening is provided by an indentation in the metal housing, the properties of the contactless reader antenna and/or the contactless reader module may be adjusted in order to account for the location of the metal.

Figure 8:
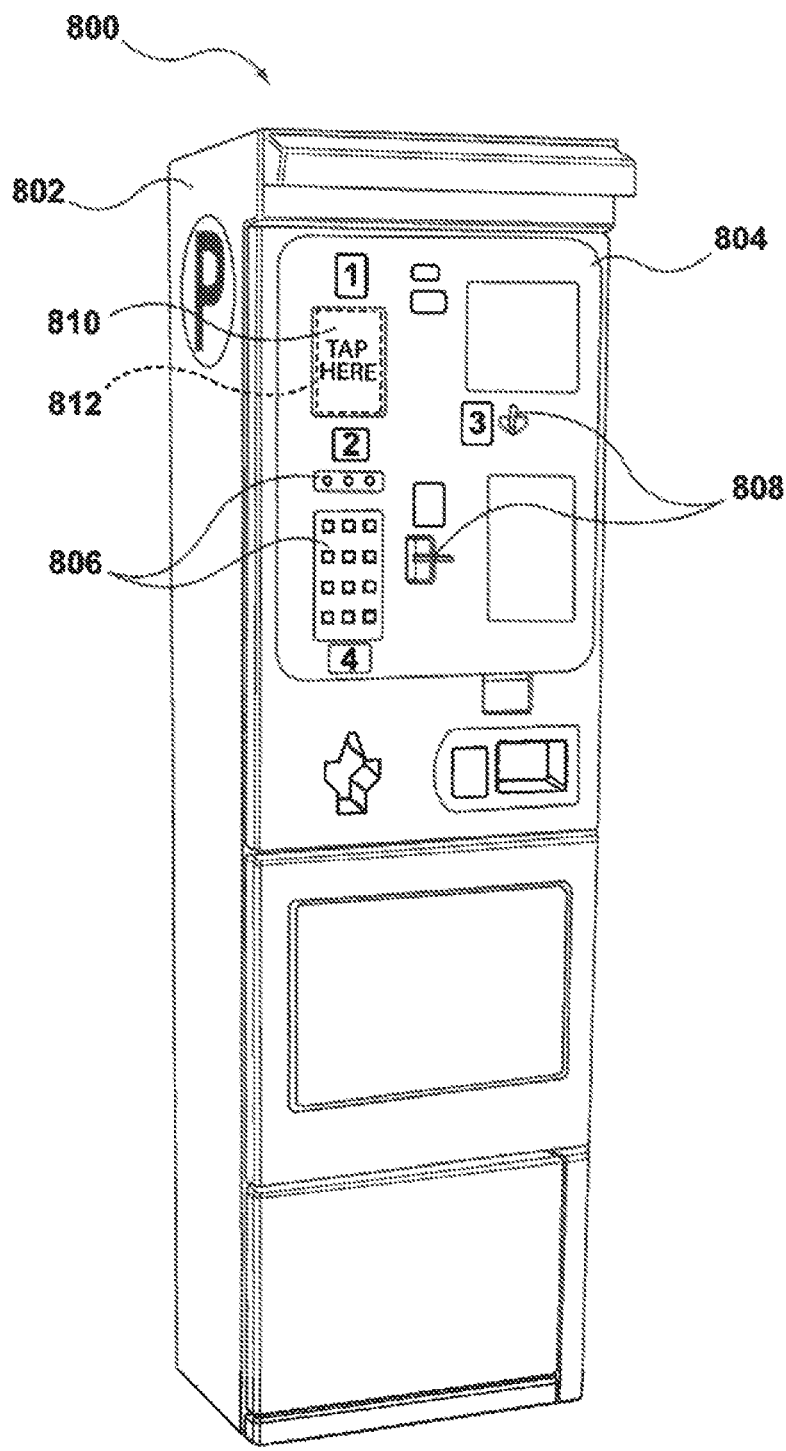
FIG. 8 depicts illustrative components of a multi-space parking meter including contactless payment means.

FIG. 8 depicts illustrative components in a multi-space parking meter. The multi-space parking meter 800 provides metering functionality to a plurality of parking spaces. The multi-space parking meter 800 may be a pay and display type meter in which payment is made by a user and a printed ticket is displayed on the user's vehicle. Alternatively, the multi-space meter 800 may be a pay by space or pay by plate type of meter, in which payment is made and associated with a specific parking space or license plate. Regardless of the type of multi-space meter, the meter 800 typically comprises a metal cabinet or enclosure 802 that encloses the components of the parking meter. Components of the multi-space meter may be located or mounted within the enclosure 802 at convenient locations. In contrast to a single space meter, where a parking meter mechanism is typically removable as a unit, the mechanism of the multi-space meter may comprise the various components that provide parking meter functionality. The cabinet 802 includes a payment section 804 comprising input means 806 such as buttons and/or keypads, for controlling operation of the parking meter, one or more payment means 808 such as credit card, debit card and/or smart card readers and coin chutes, and a display 810 for displaying parking information. The multi-space parking meter 800 further includes a contactless payment reader that includes a contactless reader antenna 812 located in sufficiently close proximity to the display 810 so that a contactless payment device placed in the vicinity of the display 810 has an acceptable success rate for reading a contactless payment device.

The contactless reader antenna 812 is depicted as being located about a perimeter of the display 810. It is contemplated that the contactless reader antenna 812 could be located in different locations in or on the parking meter 800 and arranged in sufficiently close proximity to the display 810 so that a contactless payment device placed in the vicinity of the display 810 has an acceptable success rate for reading a contactless payment device.

The specific design of the contactless reader antenna may vary depending on numerous factors, including the size of the opening within which the antenna is located, the proximity of the contactless reader antenna to the metal of the parking meter housing, whether or not the opening has a metal backing, etc. Further, the wires or wire traces forming the contactless reader antenna may also vary, for example, if the contactless reader antenna is placed over the viewable portion of the display or solar panels, the wires or wire traces may be sufficiently small so as to not obstruct the view of the display, or functioning of the solar panel.

Figure 9:
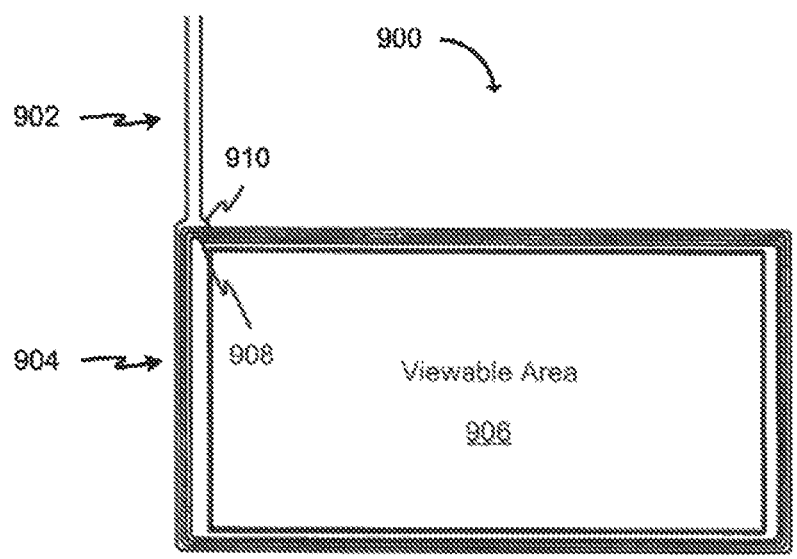
FIG. 9 depicts an illustrative contactless reader antenna.

FIG. 9 depicts an illustrative contactless reader antenna. The contactless reader antenna 900 comprises a plurality of connected traces forming a single electrical wire. As depicted, the contactless reader antenna 900 comprises a tail portion 902 that is used to connect the contactless reader antenna to the contactless reader module and a loop portion 904 that surrounds a viewable area 906 of the display of the parking meter. It is noted that the loop portion 904 terminates at an inner location 908, however this inner location 908 is electrically connected to one of the traces of the tail portion 902. This electrical connection, depicted as wire 910, between the inner location 908 of the loop portion 904 and the tail portion 902 is electrically insulated from the other wires or wires traces of the loop portion 904.

The above has described placement of a contactless reader antenna within a parking meter. Advantageously, the antenna placement has been described as being located in close proximity to a display, facilitating easy instructions for the use of the contactless reader. As will be appreciated, single space parking meters commonly found in North America, and other parts of the world, have a common outer housing made of a high strength metal, such as ductile iron, nickel or zinc. The commonly shaped housing allows different parking meter mechanisms to be received within the housing. While convenient for replacing the parking meter mechanism, the use of a common housing reduces the locations that the contactless reader antenna may be placed, as the lower metal housing is common and generally already installed on the street. As such, it is desirable to locate the contactless reader antenna in a location on the replaceable parking meter mechanism that is not covered by the common lower housing when the parking meter is assembled. As described above, the contactless parking meter antenna may be located within an aperture of an upper housing or cover of the parking meter mechanism. The aperture has been described above as being provided for the parking meter display and/or input controls of the parking meter. Depending upon the size of the display aperture, the efficiency of the contactless reader antenna may be less than ideal. For example, if the display aperture is relatively small, a contactless reader antenna that surrounds the display may still be located in close proximity to the metal housing of the cover. The close proximity of the metal to the contactless antenna may adversely affect the operation of the contactless reader antenna and the antenna may not be able to achieve a desired performance level.

It is possible to locate the contactless reader antenna in a location other than surrounding, or immediately adjacent to, the display. For example, the parking meter 500 includes an opening or aperture 510 for receiving a solar panel 512. As depicted in FIG. 5, the solar panel aperture 510 is relatively large compared to the display opening 504, while still being located in close proximity to the display. It is contemplated that the contactless reader antenna may be located within the solar panel aperture 510.

Figure 10:
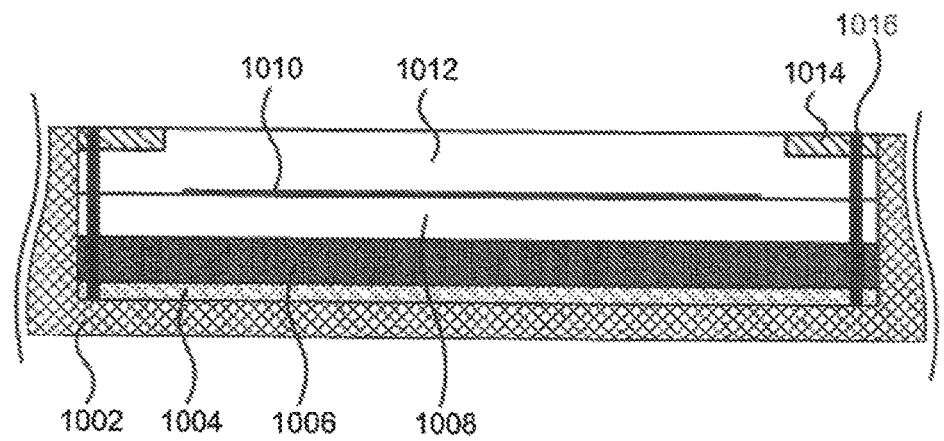
FIG. 10 depicts a cross section of the solar panel aperture of FIG. 5 taken along line 10-10'.
Figure 11:
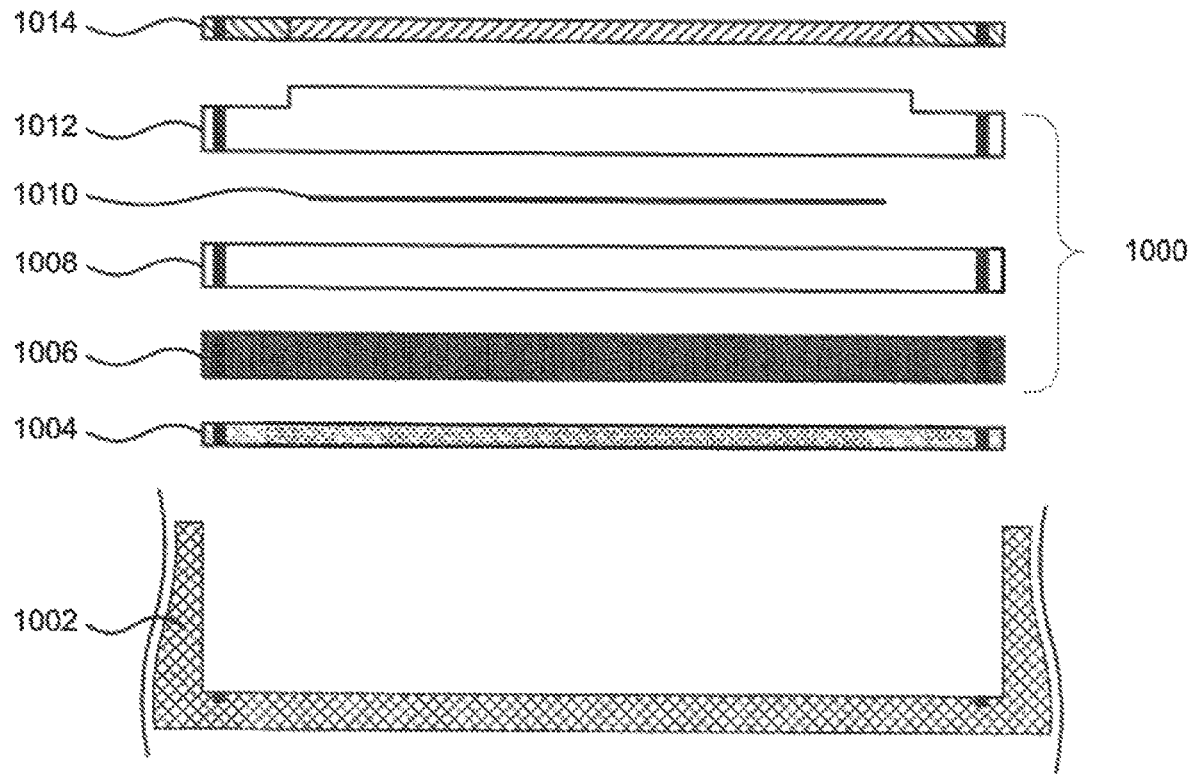
FIG. 11 depicts the component layers within the solar panel aperture of FIG. 10.

FIG. 10 depicts a cross section of the solar panel aperture 510 of FIG. 5 taken along line 10-10'. FIG. 11 depicts the component layers within the solar panel aperture of FIG. 10. As depicted in FIGS. 10 and 11, a solar panel assembly 1000 located within a solar panel aperture is depicted. As depicted, the solar panel aperture is provided within a metal housing 1002 of the parking meter. The bottom of the solar panel aperture is lined with a radio frequency (RF) shielding material 1004 that absorbs RF signals, such as those radiated by the contactless antenna. The solar panel assembly is received on top of the RF shielding 1004 and includes a solar panel 1006 that is sized to be received within the solar panel aperture. A lower transparent covering 1008, such as a 1/16" Lexan covering, is located on top of the solar panel 1006. The contactless reader antenna 1010, which may be a coiled loop of very fine gauge copper wires shaped in a 2"×3" loop, is located on top of the lower transparent covering 1008. A second transparent covering 1012, such as a 1/16" Lexan covering, may be placed on top of the contactless reader antenna 1010. The solar panel assembly, comprising the solar panel 1006, the first transparent covering 1008, the contactless reader antenna 1010 and the second transparent covering 1012 may be secured in place within the solar panel aperture by a metal covering plate or bezel 1014. The covering plate has an aperture through which light can pass through to the solar panel 1006. The covering plate may be secured in place using one or more screws or bolts 1016 that pass through the solar panel assembly and the RF shielding layer 1004 into the bottom of the solar panel aperture. Although depicted as passing though the different layers, it is contemplated that the individual layers may be sized such that the screws or bolts do not pass through them.

Advantageously, the size of the solar panel aperture allows the contactless reader antenna to be located a sufficient distance away from the surrounding metal housing to provide improved reading characteristics. Further, the placement of the contactless reader antenna 1010 on top of the first transparent covering 1008 and the solar panel 1006 provides a gap between the contactless reader antenna 1010 and the metal 1002 of the bottom of the solar panel aperture. Further, the RF shielding 1004 located in bottom of the solar panel aperture further improves the operation of the contactless reader antenna 1010. While the contactless reader antenna 1010 is located above the solar panel 1006, and so will block some light that would otherwise be incident upon the solar panel, the amount of light blocked may be negligible due to the fine gauge of the copper traces of the contactless reader antenna.

As described above with reference to FIGS. 10 and 11, a contactless reader antenna may be located within a solar panel aperture. As depicted in FIG. 5, the solar panel aperture 510 may be located in close proximity to the display 506 of the parking meter, possibly simplifying the instructions for the use of the contactless reader antenna. For example, the display 506 may be used during a payment to display easy-to-use instructions to a user for effecting contactless payment via the contactless reader antenna located within the proximal solar panel aperture 510. Locating the contactless reader antenna within the solar panel aperture 510 may also provide improved operating characteristics when compared to locating the contactless reader antenna within a possibly smaller display opening.

In addition to providing adequate operating characteristics, it is further desirable to provide a single space parking meter that is simple to manufacture and easy to maintain. It is possible to incorporate the contactless reader antenna and the solar panel in a single component that can be easily installed and/or replaced within a single space parking meter.

Figure 12:
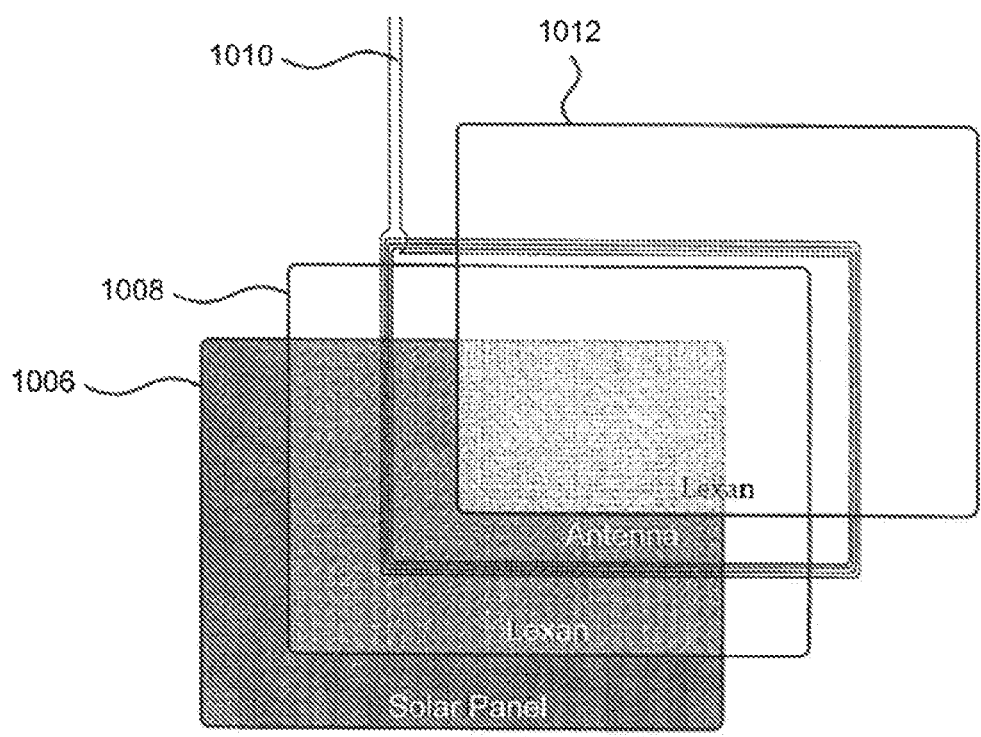
FIG. 12 depicts a layered construction of a solar panel assembly.

FIG. 12 depicts a layered construction of a solar panel assembly as described with reference to FIGS. 10 and 11. The solar panel assembly 1000 may be manufactured into a single component, allowing easy replacement of the solar panel component in the parking meter. As depicted in FIG. 12, the solar panel assembly 1000 may comprise a stacked arrangement of the solar panel 1006, the first transparent covering 1008, the contactless reader antenna 1010, and the second transparent covering 1012.

The solar panel assembly may be installed in a parking meter by first placing a layer of RF shielding material in the bottom the solar panel aperture; placing the solar panel assembly within the solar panel aperture, and attaching the contactless reader antenna to electronics of the parking meter as appropriate; and securing the solar panel assembly within the solar panel aperture with a cover plate or bezel.

As described above, a parking meter may be provided with a contactless payment means having a contactless reader antenna arranged within an opening in the metal housing of the parking meter. As described, the antenna may be arranged on either side of a display of the parking meter. Furthermore, the antenna may be arranged on an interior surface of a material sealing an opening in the parking meter housing. A decal may be placed on the covering of the opening to hide the antenna wires while not impeding the transmission of RF signals. Furthermore the individual conductive wires of the antenna of the contactless card reader may be sufficiently small in diameter or fine that even when placed in front of the display they do not significantly interfere with the display visibility, allowing the antenna to be placed over the display. Advantageously, the opening in the metal housing for the display is typically covered with a protective material through which the display is visible, such as Lexan. This material typically provides a low attenuation of RF signals and as such locating the antenna within the opening covered by the low attenuation material provides an improved transmission path, which can increase the likelihood of successfully communicating with a contactless payment device. Furthermore, since the opening is used for viewing the display, and since the display may be used to display a logo, graphic and/or directions such as "tap here", providing clear and convenient payment instructions to the user, it is not necessary to provide an additional opening in the metal housing of the parking meter, which may improve the strength of the parking meter housing and/or possibly simplifying its construction.

Although various embodiments have been described with different placements of the contactless reader antenna, it is contemplated that the antenna could be located in or on the parking meter in different positions or configurations. The antenna should be placed in sufficiently close proximity to the display, when the parking meter is assembled, to provide an acceptable success rate of reading when a contactless payment device is placed in the vicinity of the display. Arranging the antenna in or on the parking meter in close proximity to the display allows clear instructions to be presented to the user on the display, indicating to the user where to place the contactless payment device. For example, the antenna could be located on an exterior side of the parking meter in close proximity to the display.

Various embodiments of parking meters with contactless payment means have been described. The above-described embodiments of the invention are intended to be examples of the present invention and alterations and modifications may be effected thereto, by those of ordinary skill in the art, without departing from the scope of the invention which is defined solely by the claims appended hereto.

What is claimed is:

1. A parking meter comprising:
   an external housing enclosing parking meter components from an external environment, the external housing having an aperture;
   a contactless payment reader; and
   an antenna for the contactless payment reader within the aperture to facilitate payment when the contactless payment reader and the antenna receive payment information from a contactless payment device, wherein the antenna and the contactless payment device are compatible with ISO 14443 standard.

2. The parking meter of claim 1, wherein the parking meter components comprise a display upon which parking information is displayed.

3. The parking meter of claim 2, wherein the aperture comprises a display aperture through which the display is visible.

4. The parking meter of claim 3, wherein the antenna at least partially surrounds at least a portion of the display.

5. The parking meter of claim 1, wherein the antenna at least partially surrounds input components that interact with the parking meter.

6. The parking meter of claim 5, wherein the input components comprise a plurality of buttons.

7. The parking meter of claim 1, wherein the antenna is arranged on a material sealing the aperture.

8. The parking meter of claim 1, further comprising a solar panel.

9. The parking meter of claim 8, wherein the solar panel is located within the aperture.

10. The parking meter of claim 9, wherein the antenna is arranged on the solar panel.

11. The parking meter of claim 1, further comprising additional payment components comprising one or more of:
    a card slot in the external housing for receiving a payment card; and
    a coin slot for receiving coins.

12. The parking meter of claim 1, wherein at least a portion of the housing is made of metal.

13. The parking meter of claim 1, wherein the parking meter is a single space parking meter.

14. The parking meter of claim 1, wherein the parking meter is a multi-space parking meter.

15. The parking meter of claim 1, wherein the contactless payment device comprises a contactless payment card comprising one or more of:
    a credit card; and
    a card conforming to ISO 14443 standard.

16. The parking meter of claim 1, wherein the contactless payment device comprises one or more of:
    a mobile phone;
    a smartphone;
    a wrist watch;
    a tag; and
    a token.

* * * * *